United States Patent
Lowe et al.

(10) Patent No.: US 9,773,508 B2
(45) Date of Patent: Sep. 26, 2017

(54) SYSTEMS AND METHODS FOR IMPLEMENTING CROSS-FADING, INTERSTITIALS AND OTHER EFFECTS DOWNSTREAM

(71) Applicant: Sirius XM Radio Inc., New York, NY (US)

(72) Inventors: Raymond Lowe, Chester, NJ (US); Christopher Ward, Glen Ridge, NJ (US); Charles W. Christine, Robbinsville, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

(21) Appl. No.: 15/222,256

(22) Filed: Jul. 28, 2016

(65) Prior Publication Data

US 2017/0053660 A1  Feb. 23, 2017

Related U.S. Application Data

(63) Continuation of application No. 14/358,919, filed as application No. PCT/US2012/065943 on Nov. 19, 2012, now Pat. No. 9,406,303.

(Continued)

(51) Int. Cl.
*G10L 19/00* (2013.01)
*G10L 19/16* (2013.01)
(Continued)

(52) U.S. Cl.
CPC .......... *G10L 19/167* (2013.01); *G10L 19/008* (2013.01); *G11B 27/038* (2013.01); *H04H 60/04* (2013.01)

(58) Field of Classification Search
CPC ... G06F 9/5044; G10L 19/008; G11B 27/038; H04H 60/04; H04M 19/04; H04M 1/578; H04M 7/0069
(Continued)

(56) References Cited

U.S. PATENT DOCUMENTS 5,899,969 A  5/1999 Fielder et al.
6,184,937 B1  2/2001 Williams et al.
(Continued)

FOREIGN PATENT DOCUMENTS

KR  10-0781513 B1  12/2007
KR  10-2009-0025038 A  3/2009
(Continued)

OTHER PUBLICATIONS

International Application No. PCT/US2012/065943, International Search Report date of mailing Feb. 25, 2013.
(Continued)

*Primary Examiner* — Charlotte M Baker
(74) *Attorney, Agent, or Firm* — Kramer Levin Naftalis & Frankel LLP

(57) ABSTRACT

Systems and methods are presented for cross-fading (or other multiple clip processing) of information streams on a user or client device, such as a telephone, tablet, computer or MP3 player, or any consumer device with audio playback. Multiple clip processing can be accomplished at a client end according to directions sent from a service provider that specify a combination of (i) the clips involved; (ii) the device on which the cross-fade or other processing is to occur and its parameters; and (iii) the service provider system. For example, a consumer device with only one decoder, can utilize that decoder (typically hardware) to decompress one or more elements that are involved in a cross-fade at faster than real time, thus pre-fetching the next
(Continued)

element(s) to be played in the cross-fade at the end of the currently being played element. The next elements(s) can, for example, be stored in an input buffer, then decoded and stored in a decoded sample buffer, all prior to the required presentation time of the multiple element effect. At the requisite time, a client device component can access the respective samples of the decoded audio clips as it performs the cross-fade, mix or other effect. Such exemplary embodiments use a single decoder and thus do not require synchronized simultaneous decodes.

9 Claims, 17 Drawing Sheets

Related U.S. Application Data

(60) Provisional application No. 61/561,593, filed on Nov. 18, 2011, provisional application No. 61/631,440, filed on Jan. 3, 2012, provisional application No. 61/607,532, filed on Mar. 6, 2012, provisional application No. 61/687,049, filed on Apr. 17, 2012.

(51) Int. Cl.
*G10L 19/008* (2013.01)
*G11B 27/038* (2006.01)
*H04H 60/04* (2008.01)

(58) Field of Classification Search
USPC ............... 704/500, 270, 251, 246; 348/61; 707/736; 715/723; 379/79, 67.1
See application file for complete search history.

(56) References Cited

U.S. PATENT DOCUMENTS

| | | |
|---|---|---|
| 6,262,777 B1 | 7/2001 | Brewer et al. |
| 7,302,396 B1 | 11/2007 | Cooke |
| 7,571,016 B2 | 8/2009 | Rahman et al. |
| 7,908,172 B2 | 3/2011 | Corts et al. |
| 8,026,918 B1 | 9/2011 | Murphy |
| 8,156,526 B2 | 4/2012 | Lee |
| 8,458,595 B1 | 6/2013 | Margulis |
| 8,655,854 B2 | 2/2014 | Claman et al. |
| 8,805,693 B2 | 8/2014 | Lindahl et al. |
| 8,818,175 B2 | 8/2014 | Dubin et al. |
| 8,938,393 B2* | 1/2015 | Gunatilake ............. G10L 15/26 348/61 |
| 8,948,894 B2 | 2/2015 | Bhat |
| 9,330,722 B2 | 5/2016 | Chang et al. |
| 9,355,649 B2 | 5/2016 | King et al. |
| 9,406,303 B2 | 8/2016 | Lowe et al. |
| 2002/0105951 A1 | 8/2002 | Hannuksela et al. |
| 2002/0133357 A1 | 9/2002 | McLean |
| 2002/0159375 A1 | 10/2002 | Eguchi et al. |
| 2003/0033325 A1 | 2/2003 | Boogaard |
| 2004/0117822 A1 | 6/2004 | Karaoguz et al. |
| 2005/0201723 A1 | 9/2005 | Islam et al. |
| 2005/0249336 A1* | 11/2005 | Basir ..................... H04M 19/04 379/79 |
| 2006/0093038 A1 | 5/2006 | Boyce |
| 2006/0192478 A1 | 8/2006 | Basu |
| 2008/0046953 A1 | 2/2008 | Kossila |
| 2008/0165985 A1 | 7/2008 | Hsu et al. |
| 2008/0195695 A1 | 8/2008 | Tanaka et al. |
| 2008/0249644 A1 | 10/2008 | Jehan |
| 2008/0270523 A1 | 10/2008 | Parmar et al. |
| 2009/0024234 A1 | 1/2009 | Archibald |
| 2009/0163183 A1 | 6/2009 | O'Donoghue et al. |
| 2009/0228423 A1 | 9/2009 | Hicken et al. |
| 2010/0010997 A1 | 1/2010 | Amidon et al. |
| 2010/0030859 A1 | 2/2010 | Huang |
| 2010/0063825 A1 | 3/2010 | Williams et al. |
| 2010/0142730 A1 | 6/2010 | Lindahl et al. |
| 2011/0138299 A1 | 6/2011 | Pugsley et al. |
| 2011/0211812 A1 | 9/2011 | Tzoukermann et al. |
| 2011/0268424 A1 | 11/2011 | Holland et al. |
| 2012/0038762 A1 | 2/2012 | Davidson et al. |
| 2012/0046954 A1 | 2/2012 | Lindahl et al. |
| 2012/0259642 A1 | 10/2012 | Takada |
| 2013/0073983 A1 | 3/2013 | Rasmussen et al. |
| 2013/0131507 A1 | 5/2013 | Salazar-Ferrer et al. |
| 2013/0167029 A1 | 6/2013 | Friesen et al. |
| 2014/0237361 A1 | 8/2014 | Martin et al. |
| 2014/0316789 A1 | 10/2014 | Lowe et al. |
| 2015/0073812 A1 | 3/2015 | Lowe et al. |
| 2015/0128039 A1 | 5/2015 | Wieder |
| 2015/0142456 A1 | 5/2015 | Lowe et al. |
| 2015/0248219 A1 | 9/2015 | Wieder |
| 2015/0309844 A1 | 10/2015 | Lowe et al. |
| 2017/0053660 A1 | 2/2017 | Lowe et al. |

FOREIGN PATENT DOCUMENTS

| | | |
|---|---|---|
| KR | 10-0973654 B1 | 7/2010 |
| KR | 10-2011-0023490 A | 3/2011 |
| WO | 02/097791 A1 | 12/2002 |

OTHER PUBLICATIONS

Written Opinion, dated Feb. 25, 2013, issued in corresponding Int'l. Appln. No. PCT/US2012/065943.
International Search Report, dated Jun. 25, 2013, issued in corresponding Int'l. Appln. No. PCT/US2013/029721.
Written Opinion, dated Jun. 25, 2013, issued in corresponding Int'l. Appln. No. PCT/US2013/029721.
International Search Report, dated Jul. 26, 2013, issued in corresponding Int'l. Appln. No. PCT/US2013/037034.
Written Opinion, dated Jul. 26, 2013, issued in corresponding Int'l. Appln. No. PCT/US2013/037034.
International Search Report, dated Aug. 23, 2013, issued in corresponding Int'l. Appln. No. PCT/US2013/037013.
Written Opinion, dated Aug. 23, 2013, issued in corresponding Int'l. Appln. No. PCT/US2013/037013.

* cited by examiner

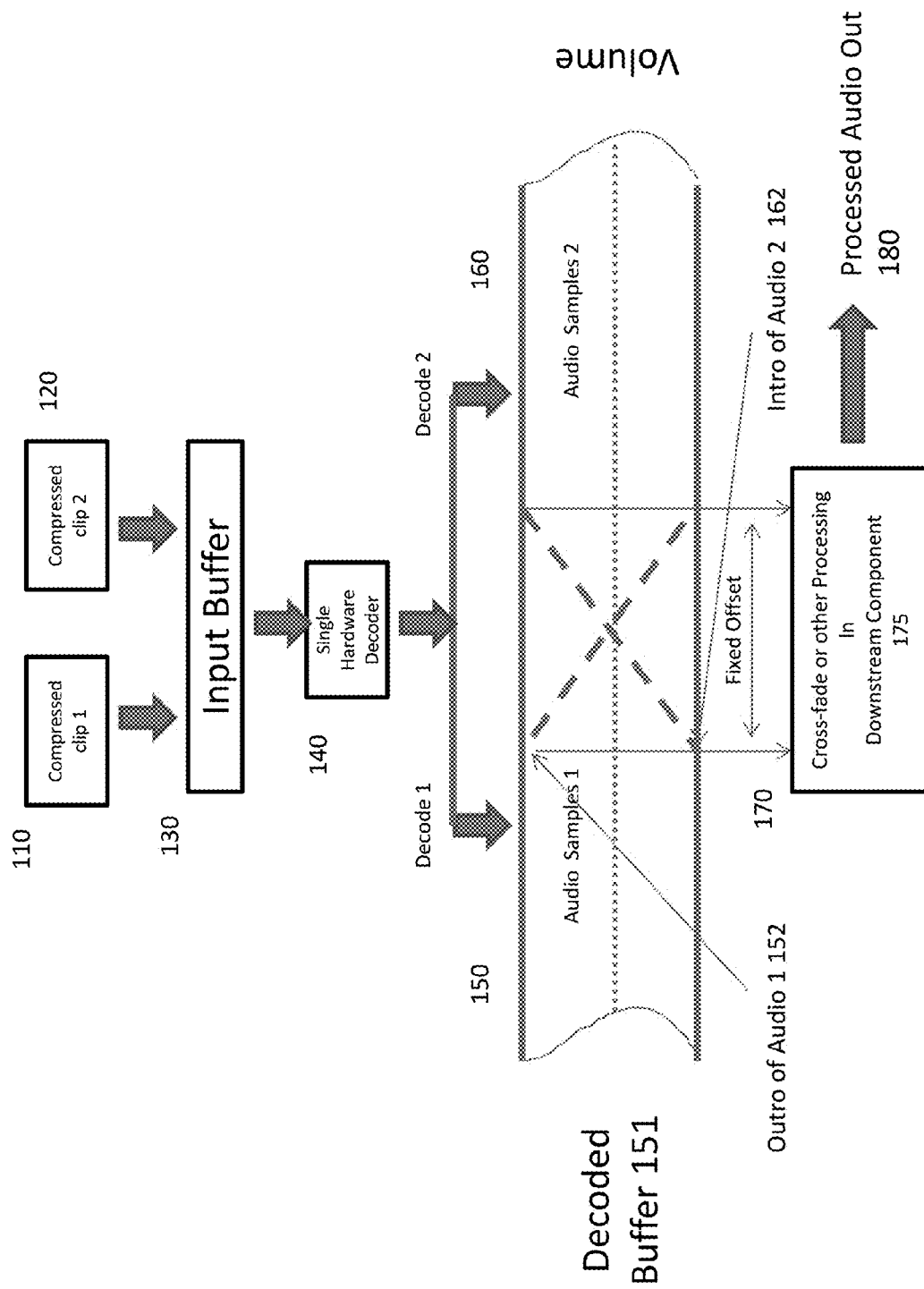
Fig. 1 - Conceptual Diagram for Supporting Cross Fades Within A Client Device

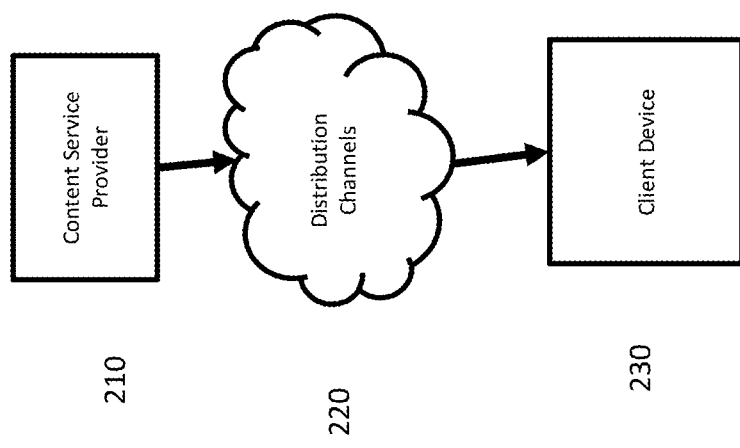
Fig. 2 - Content Distribution and Reception System

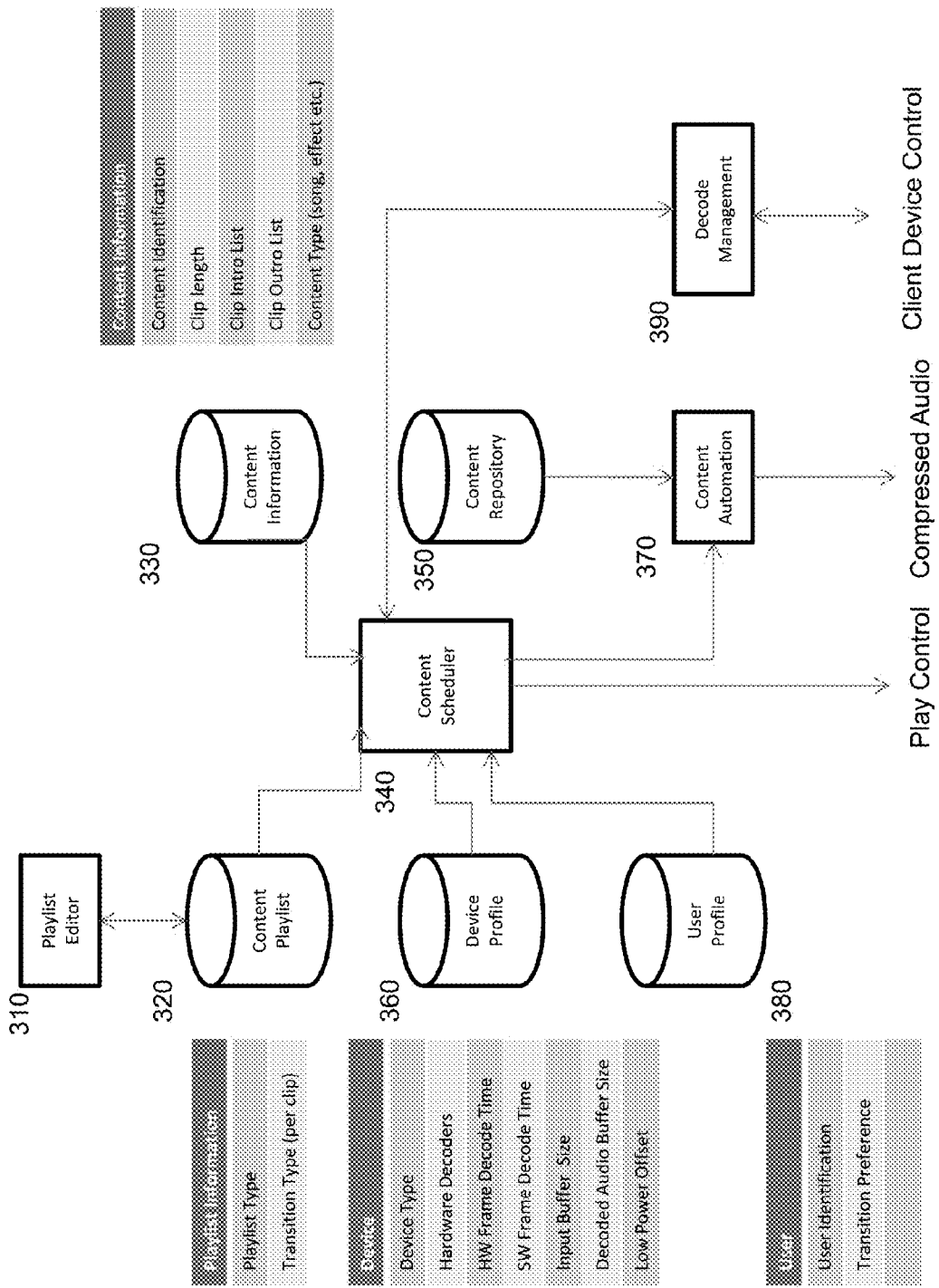
Fig. 3 - Content Distribution System (Service Provider System)

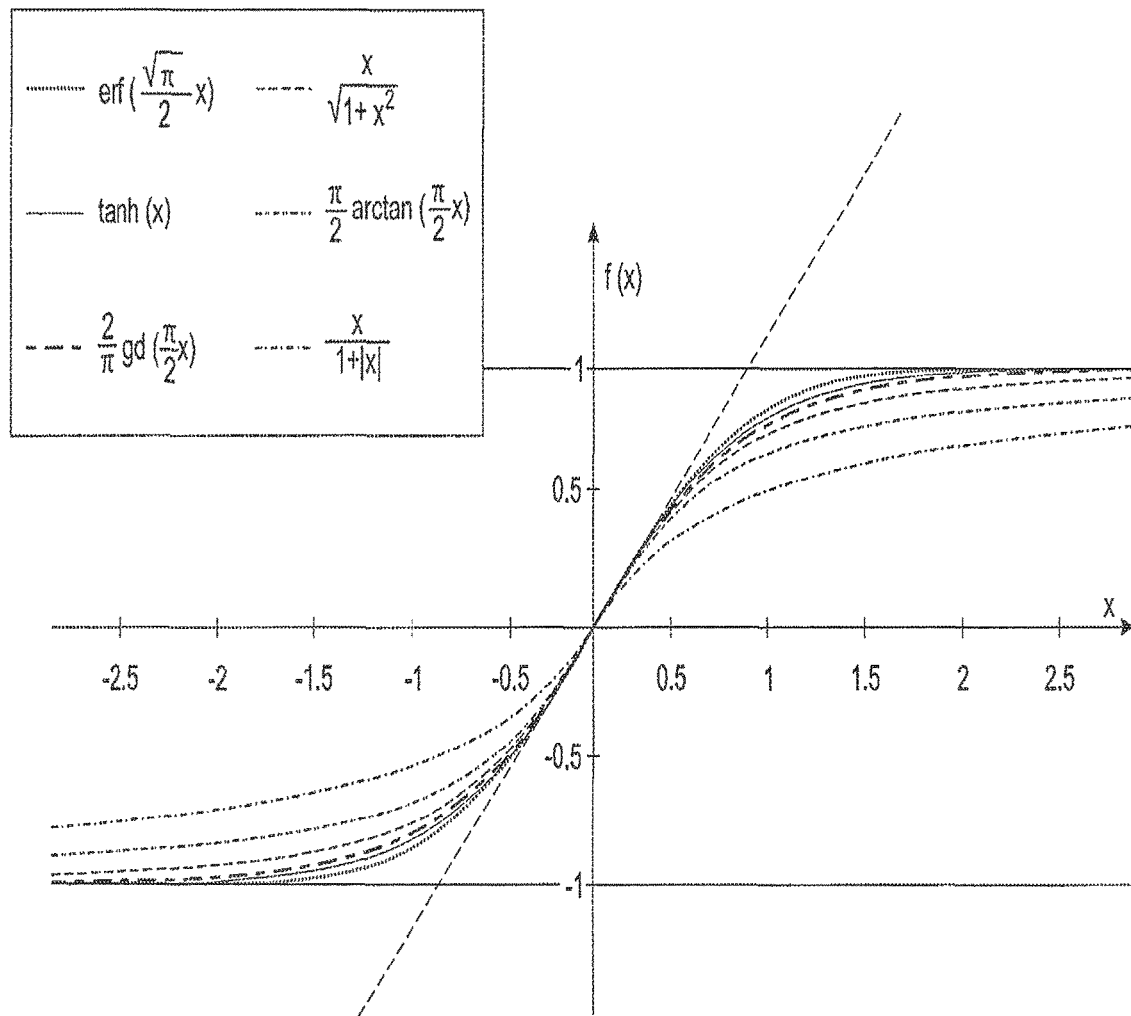
Fig. 3A - Exemplary Sigmoid Functions

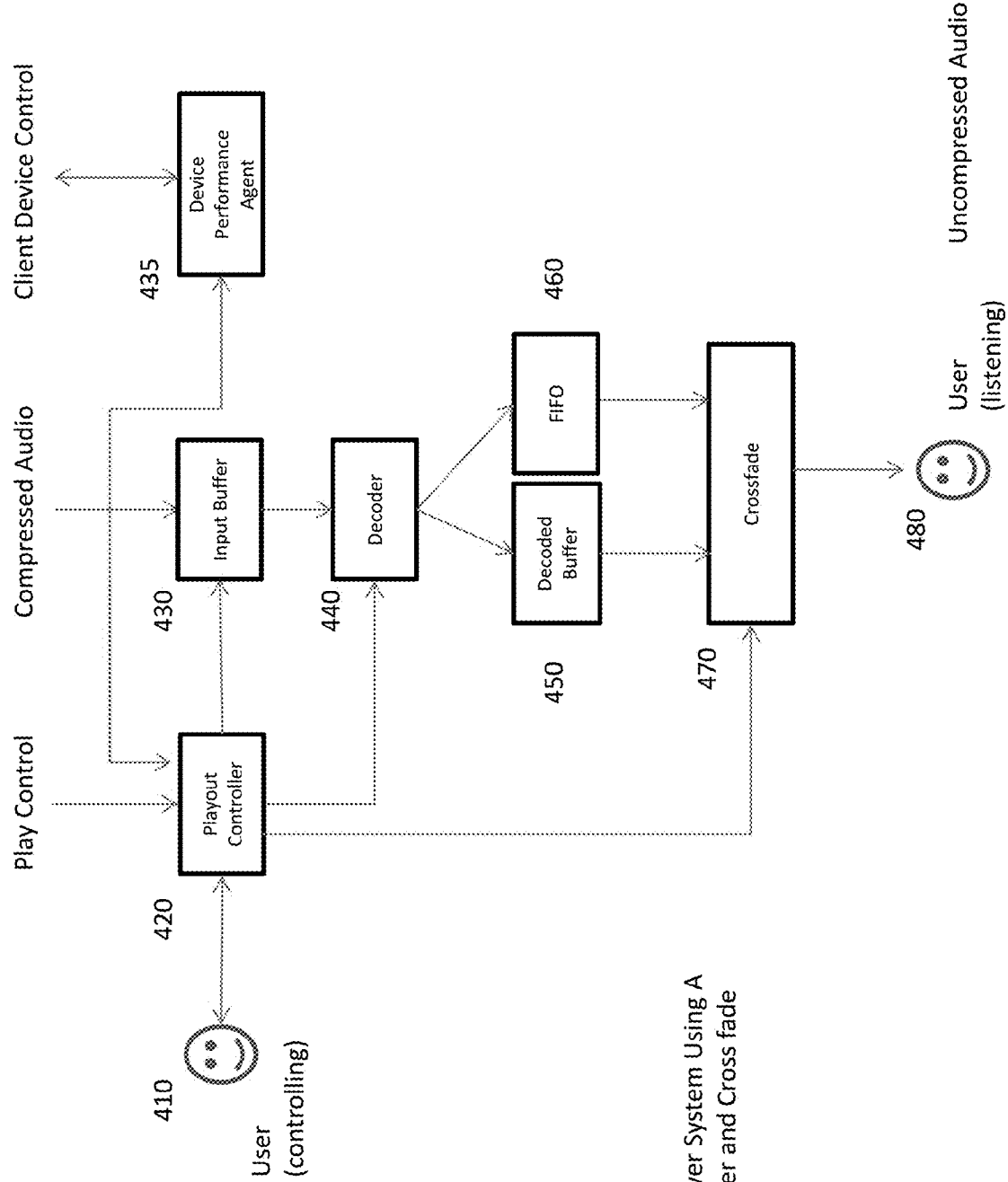
Fig. 4 - Receiver System Using A Single Decoder and Cross fade

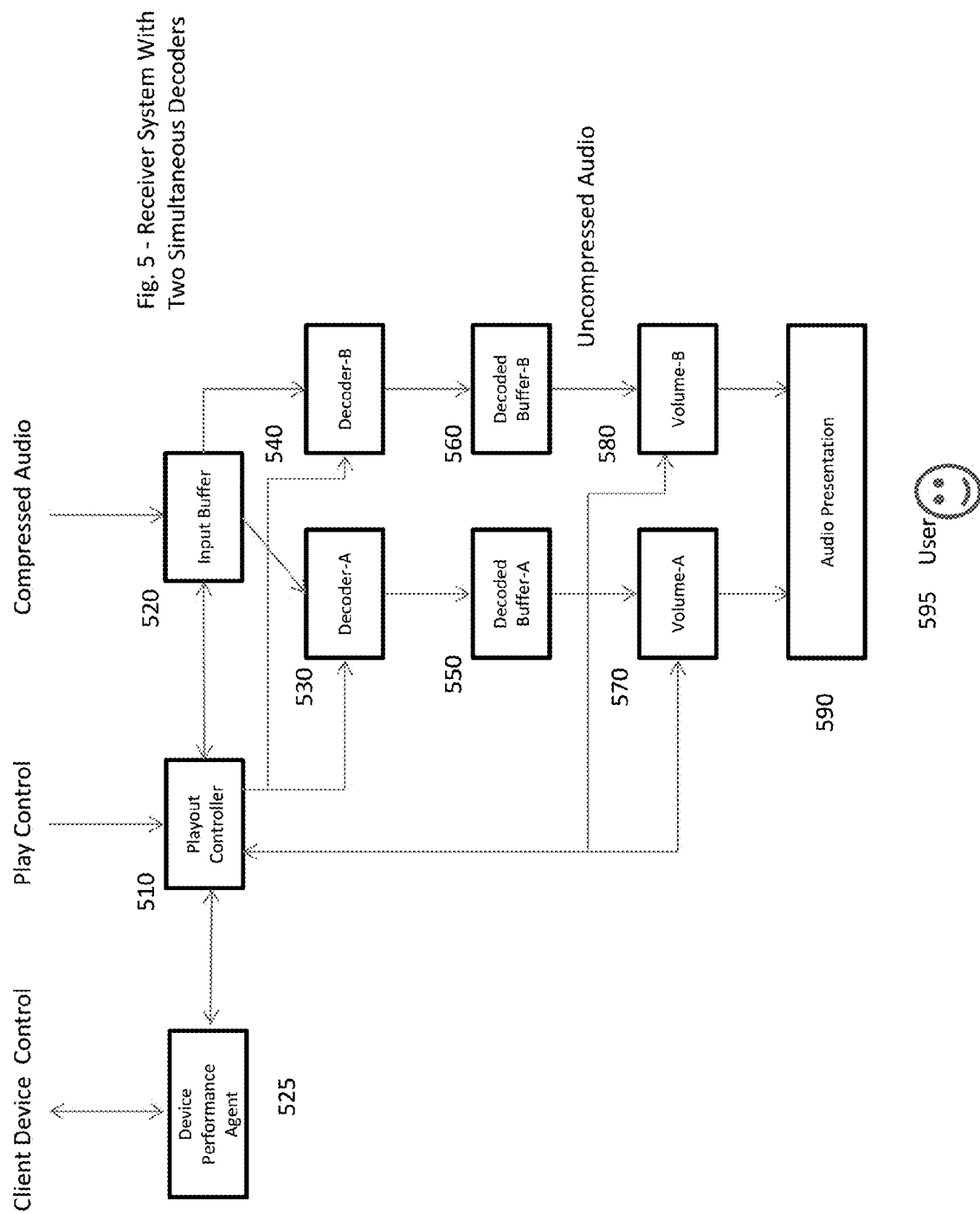

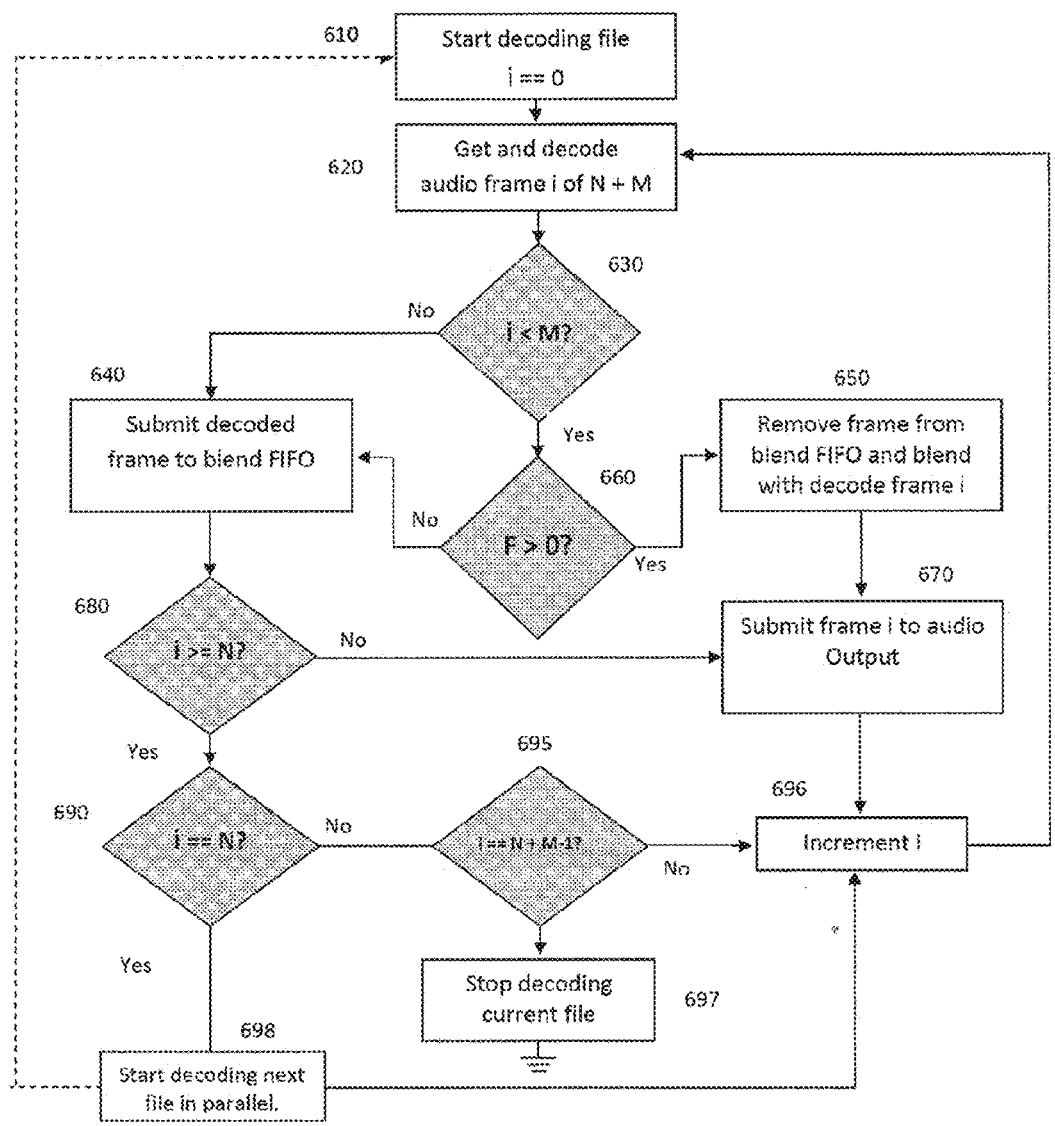
Fig. 6 – Cross-fade Algorithm Where Access To Uncompressed Audio Buffer On Client Is Available

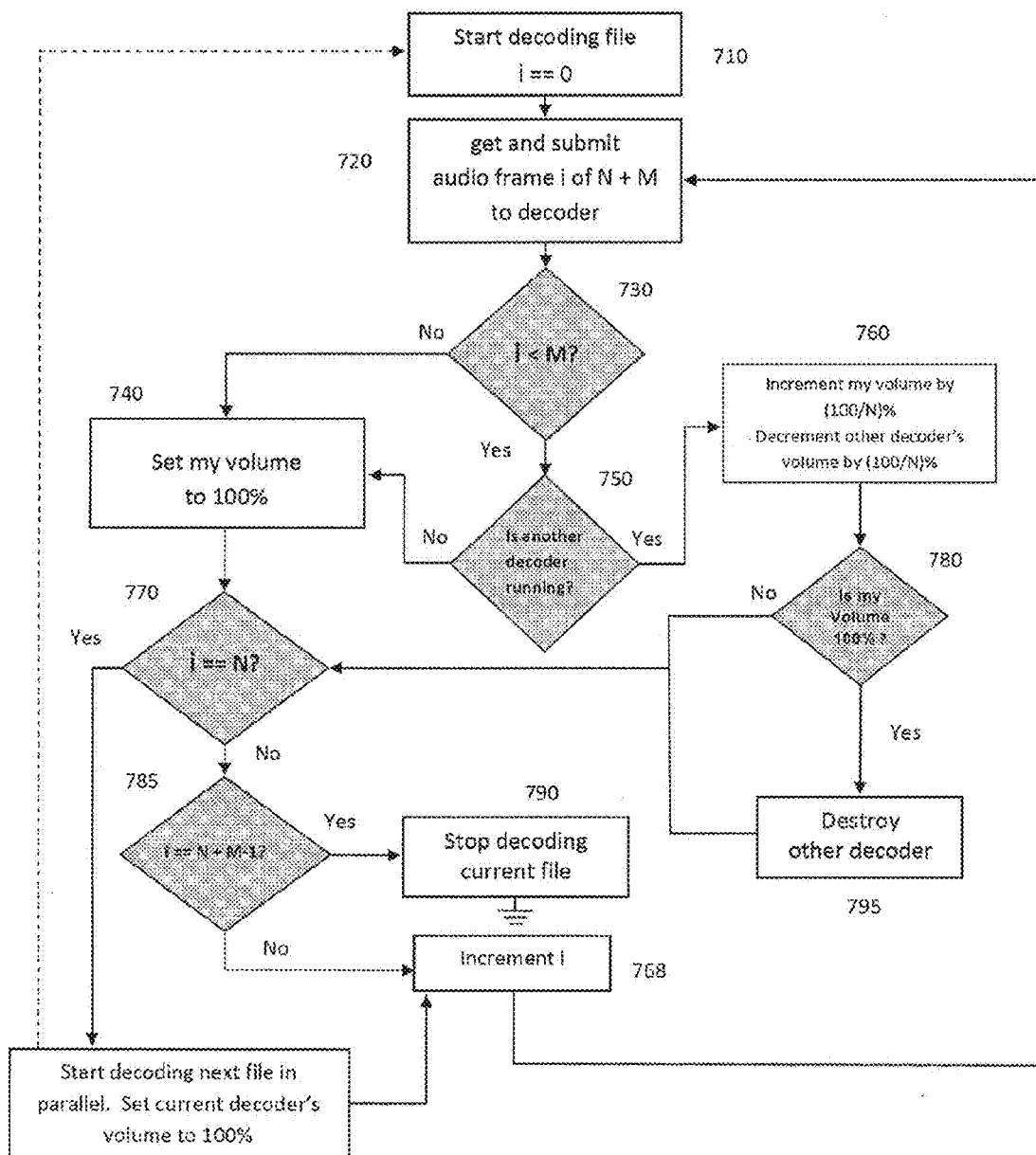
Fig. 7 – Cross-fade Algorithm Where Access to Client Uncompressed Audio Buffer Is Not Available

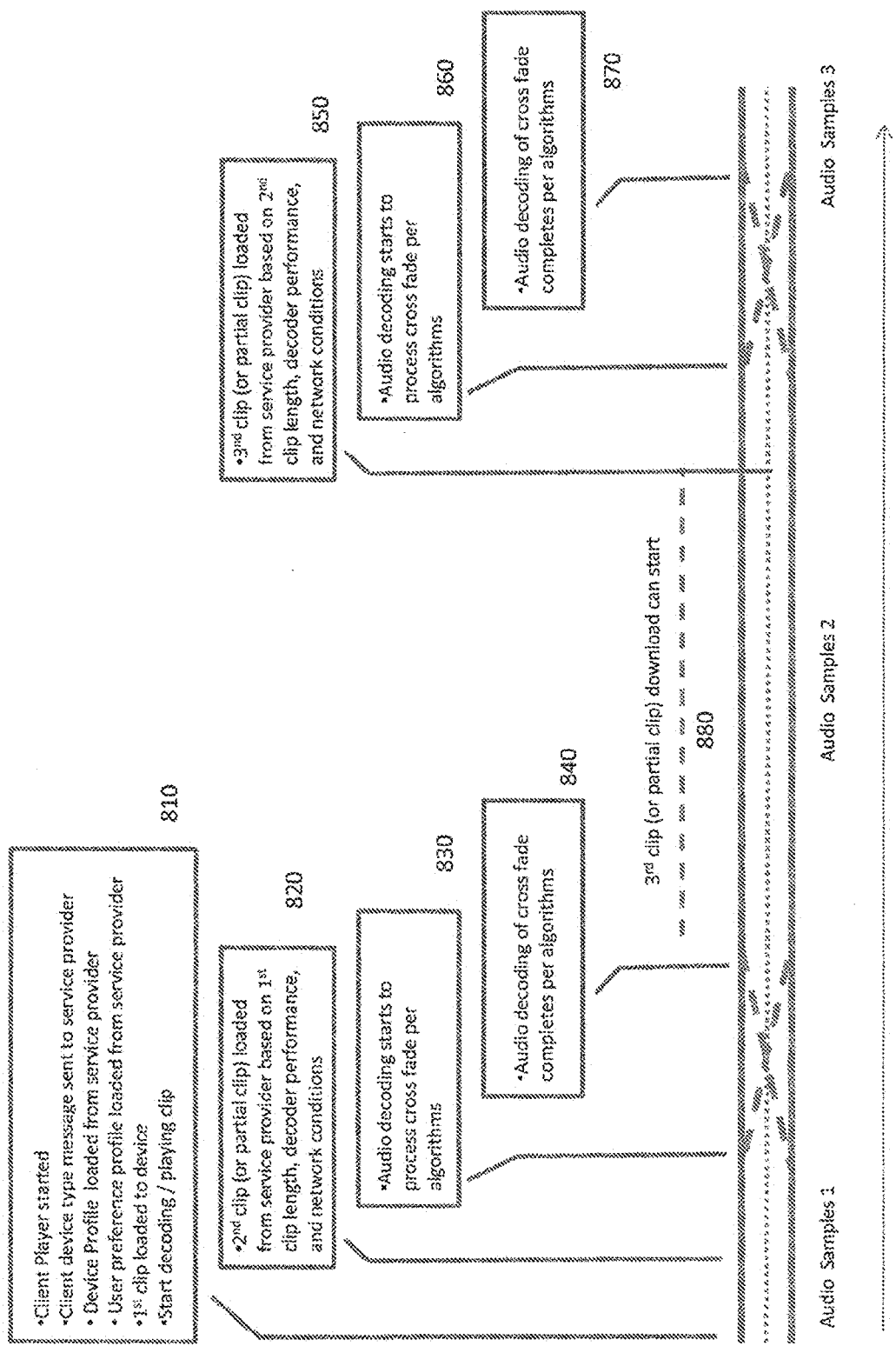

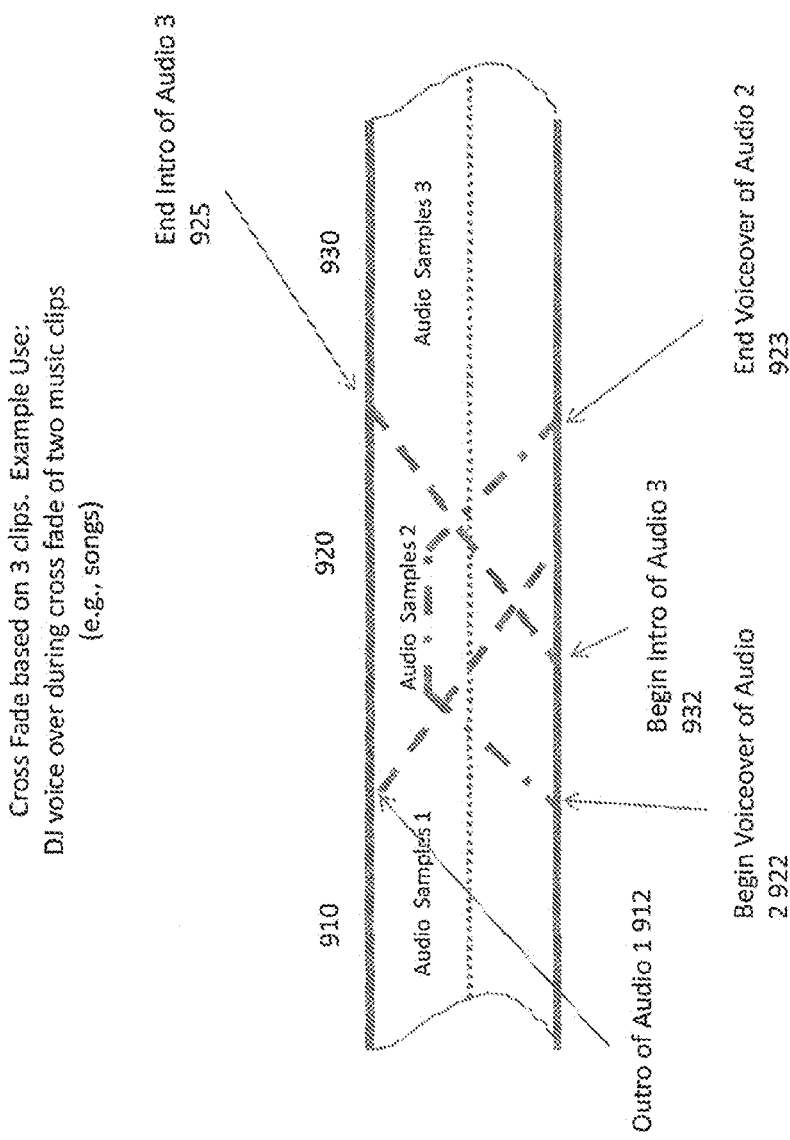

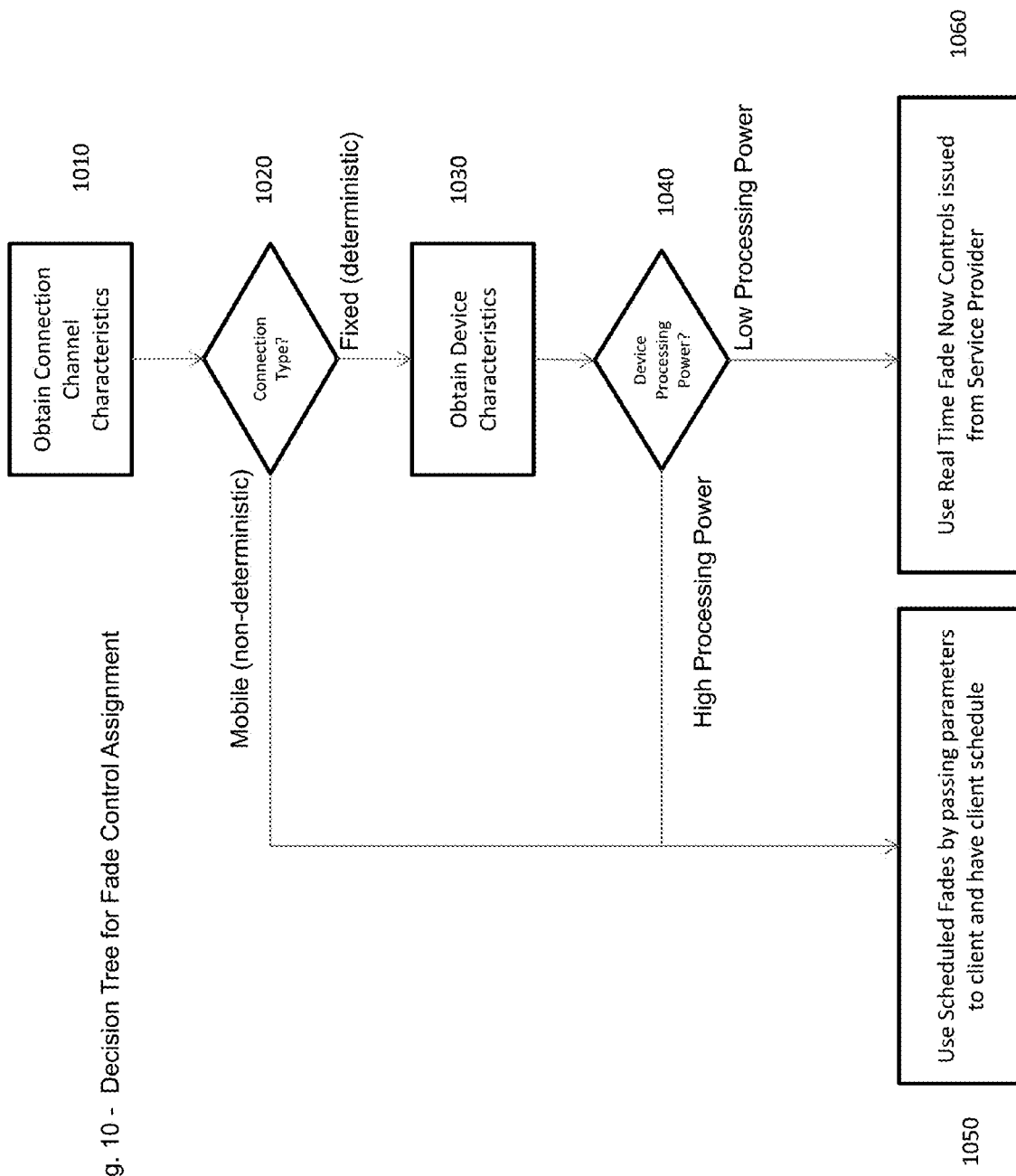
Fig. 10 - Decision Tree for Fade Control Assignment

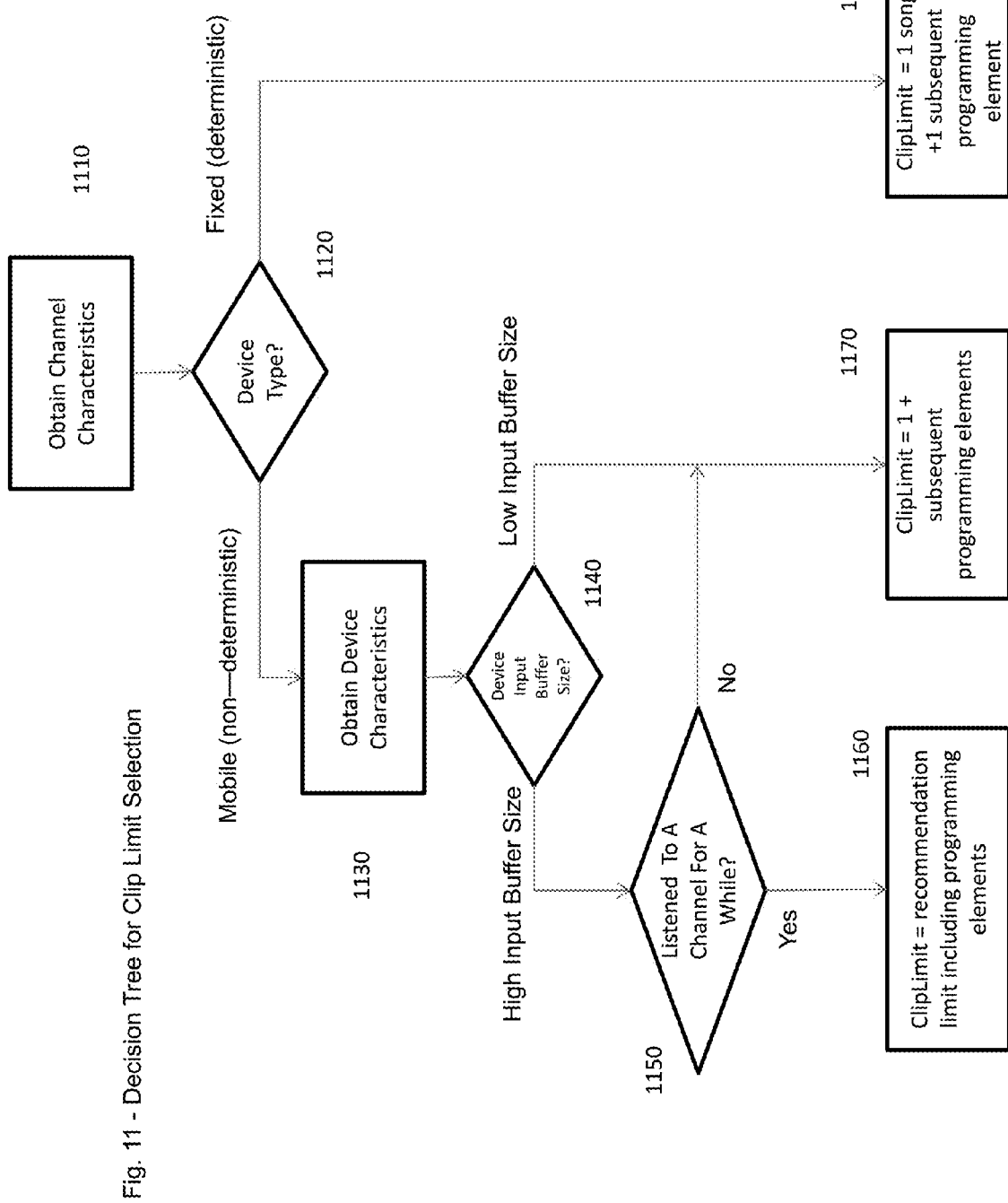
Fig. 11 - Decision Tree for Clip Limit Selection

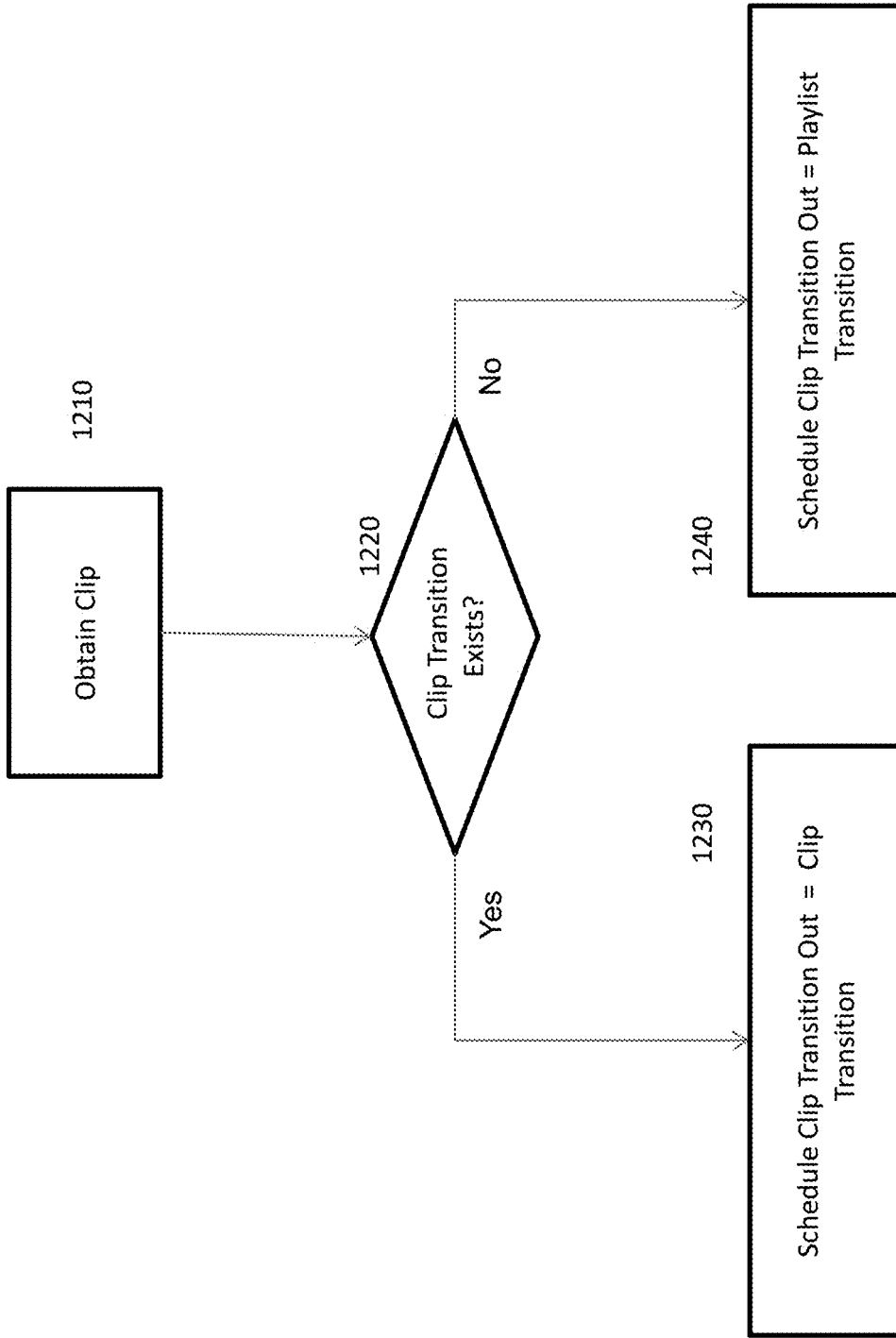

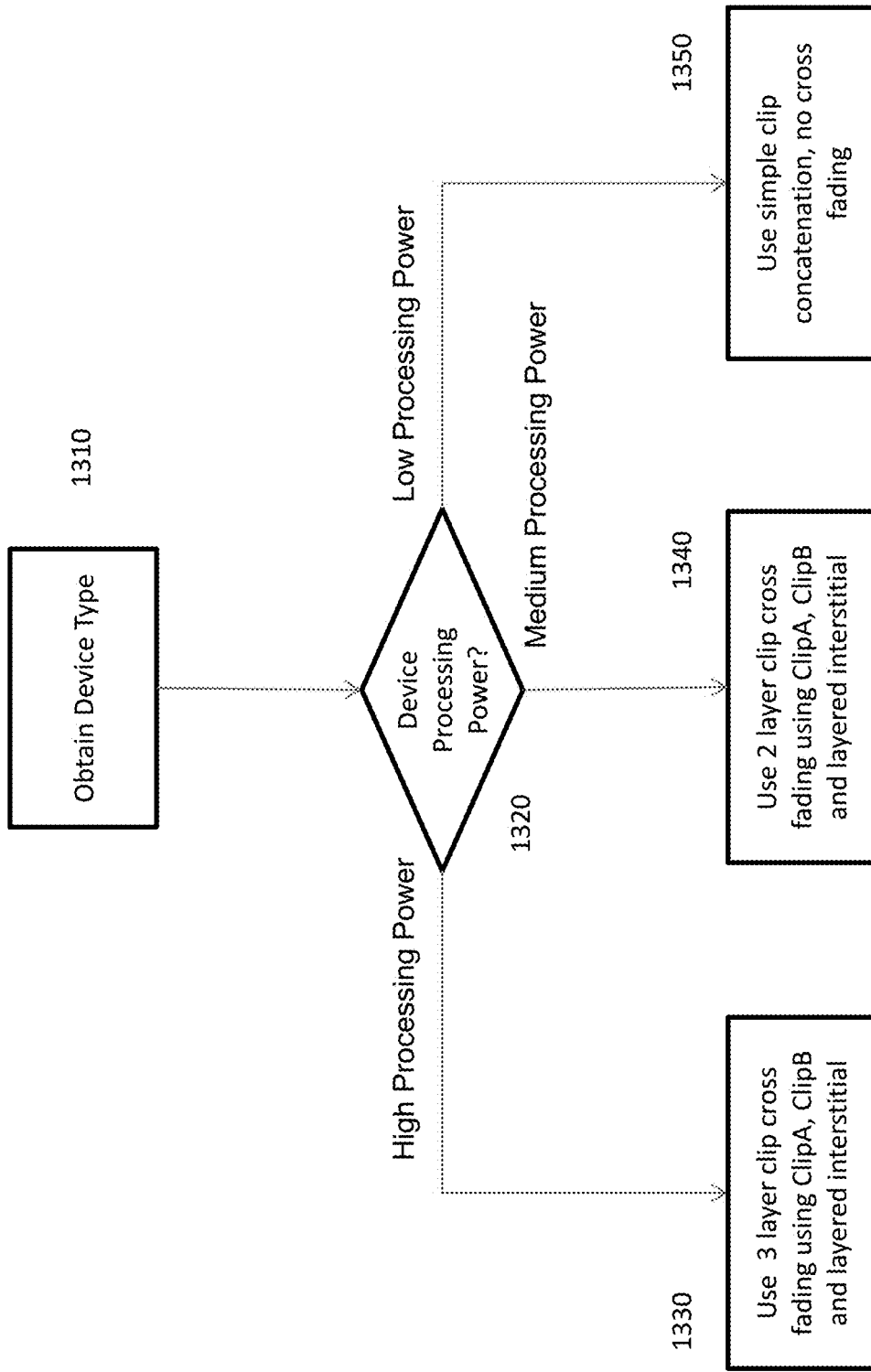
Fig. 13 - Decision Tree for Concurrent Layer Selection

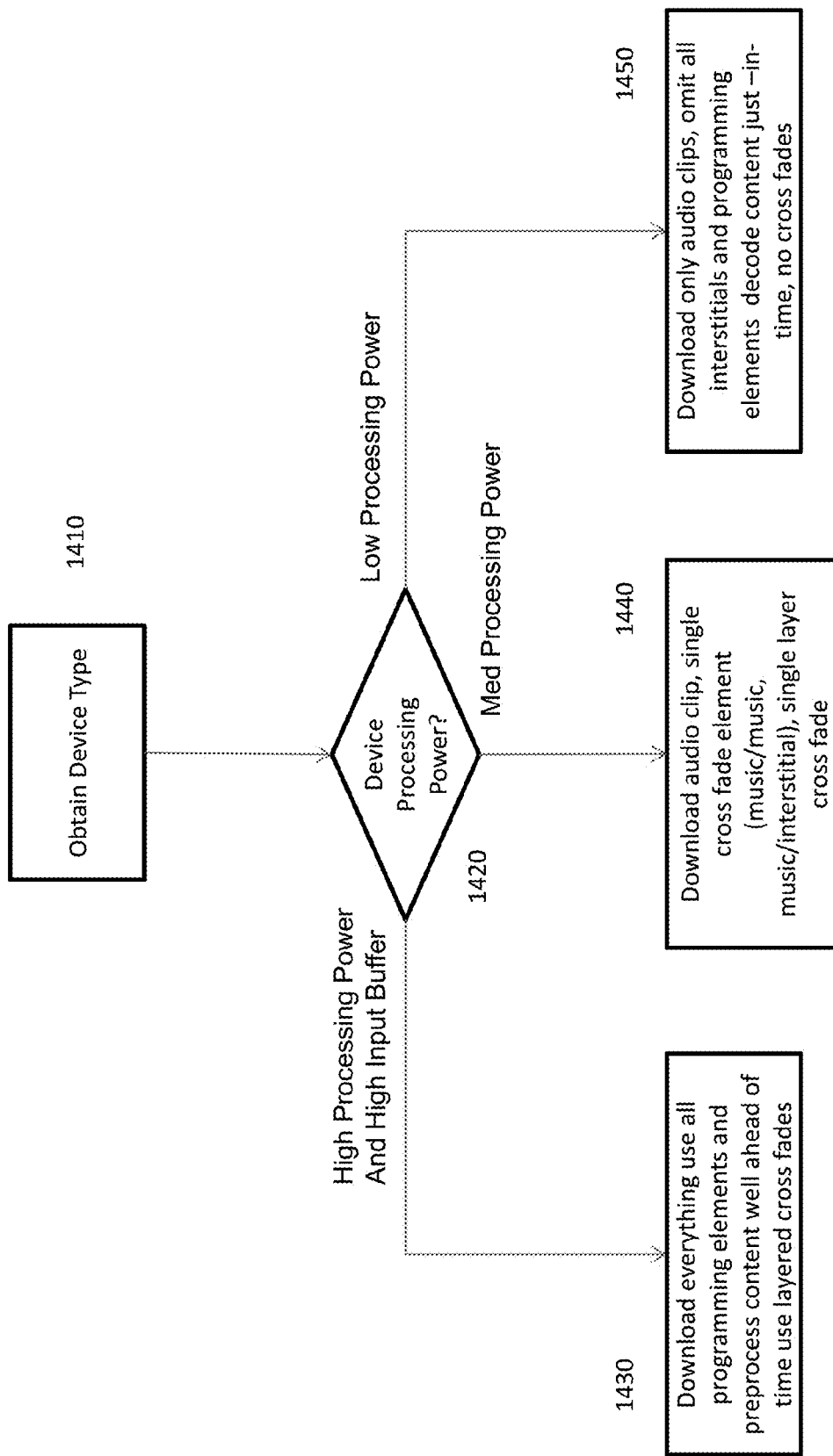
Fig. 14 - Decision Tree for Content Download/Playback Selection

Fig. 15 - Dynamic Decision Criteria to Influence Algorithm Selection

| Computed Time Available Based on Upcoming Events 1510 | Processing Power Available 1520 | Input Buffer Size 1515 | Connection Rate/Compressed Bit Rate 1530 | Algorithm 1540 |
|---|---|---|---|---|
| High | High | High | High | Download everything, use all programming elements and preprocess content well ahead of time, use layered cross fades 1560 |
| High OR N/A | High | Low | High | Download everything, use all programming elements and preprocess content well ahead of time, use single layer cross fade 1561 |
| N/A | OR if Low | OR if Low | OR Low | Download audio clip and a single cross fade element (music/music, music/interstitial), single layer cross fade 1562 |
| Low | Low | Low | Low or N/A | Download only audio clips, omit all interstitials and programming elements, decode content just time, no cross fades 1563 |

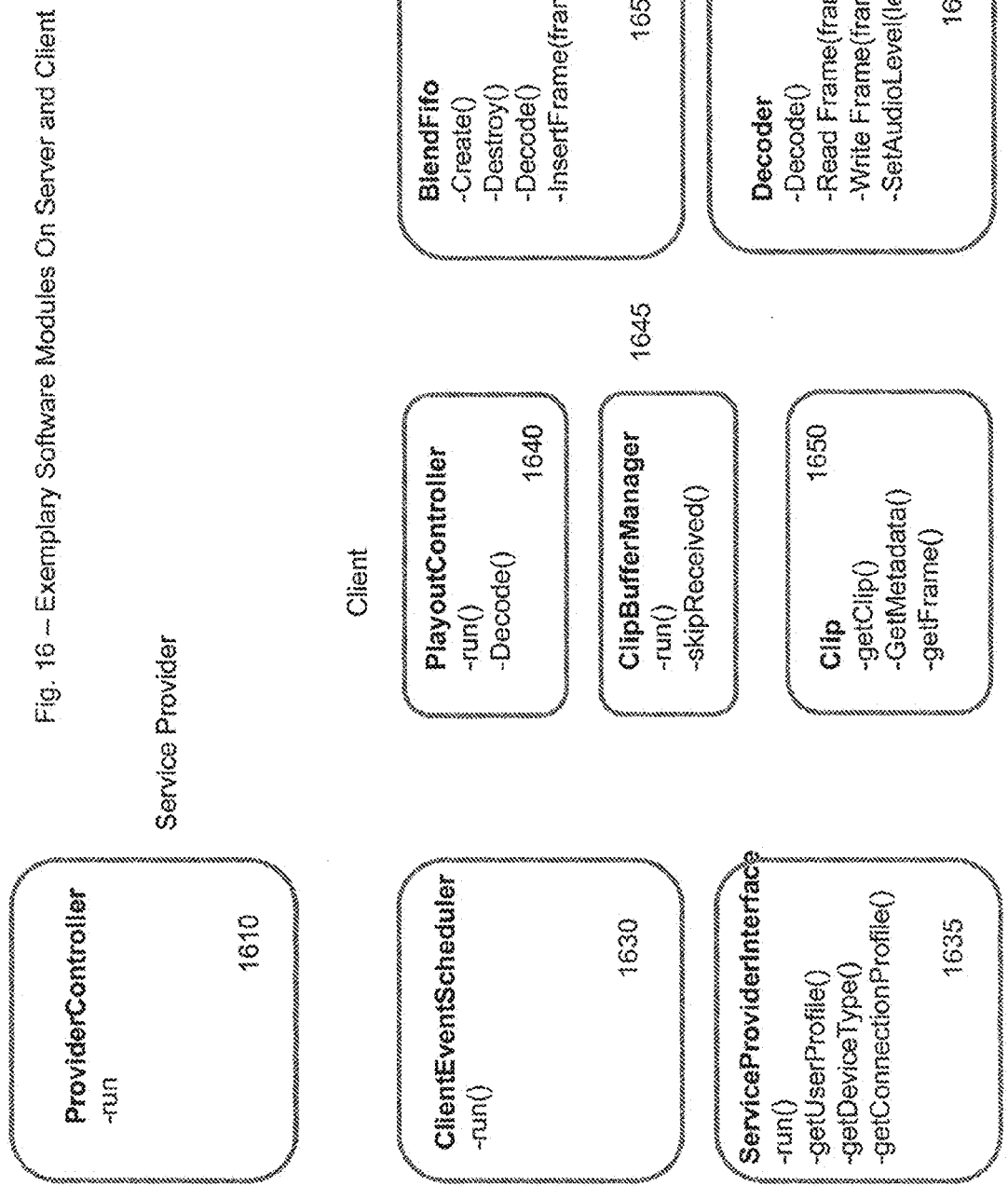
Fig. 16 – Exemplary Software Modules On Server and Client

SYSTEMS AND METHODS FOR IMPLEMENTING CROSS-FADING, INTERSTITIALS AND OTHER EFFECTS DOWNSTREAM

CROSS REFERENCE TO RELATED APPLICATIONS

This application is a continuation of U.S. patent application Ser. No. 14/358,919, filed on May 16, 2014, which is a U.S. national phase filing of the corresponding international application number PCT/US2012/065943, filed on Nov. 19, 2012, which claims the benefit of U.S. Provisional Patent Application Nos. (i) 61/561,592, filed on Nov. 18, 2011, (ii) 61/631,440, filed on Jan. 3, 2012, (iii) 61/607,532, filed on Mar .6, 2012, and (iv) 61/687,049, filed on Apr. 17, 2012, the disclosure of each of which is hereby fully incorporated herein by reference.

TECHNICAL FIELD

The present invention relates to digital media delivery and playback, and in particular to systems and methods for implementing cross-fading, interstitials and other effects and/or processing of two or more media elements on a downstream device for various purposes. One exemplary purpose can include the replication, to the extent possible, of the feel, sound and flow of broadcast programming.

BACKGROUND OF THE INVENTION

Media delivery has historically followed a broadcast type model, where users/consumers all receive the same programming. Thus, any effects, cross-fades or other blending between subsequent clips or program elements are performed upstream of the consuming device, prior to being sent over the broadcast channel(s). As is generally appreciated, the addition of these effects produces a high quality experience for the user, and also provides natural and enhanced transitions between program elements. These enhancements can significantly improve and enrich the listening experience, and can be changed or modified depending upon the "mood" of the channel, the sequence of songs or clips being played, as well as the audience type, time of day, and channel genre. Typically, elements that require cross-fading, blending or other signal processing of two or more elements require precise synchronization and simultaneous playback of the elements to be processed. Thus, although in the 1960s and 1970s DJs would try to mix songs in real time, by "cueing up" the next song and starting its turntable a bit before the currently being played song ended, with the advent of digital media it has become the norm to perform such processing on a playlist of multiple songs or clips prior to broadcasting it, storing its result at the media provider or broadcaster's servers, and then send it over the broadcast channel.

With the introduction of media compression and file based delivery, various types of media are commonly downloaded directly to a user's device, such as, for example, an iPod, digital media player, MP3 player, PC, tablet, cellular phone, smart phone, etc., and various hybrid devices or devices with equivalent functionalities, without the benefit of upstream processing between media elements. This leads to a less satisfactory user experience upon user consumption or playback. A user simply hears one song stop, then hears a brief pause, then hears the next song begin. There is no "awareness" by the media playing device as to what the sequence is, no optimizations as to which song most naturally follows another in the playlist, no sense of the "feel" "mood" or tempo of the playlist or any segment of it, and each sequence of media clips is, in general, unique to each user and how they organize their respective playlists.

Additionally, many consumer type devices, cell phones, smart phones, tablets, etc. do not have the capability to perform simultaneous decode and presentation of media and elements so that they can be cross-faded or processed as played back in real time. Such devices, for example cell phones, typically have a single hardware decoder per media type, so that any type of cross-fade in real time would also require additional software based decoding for the other elements, which (i) has negative impact on battery life, and (ii) would also require the precise synchronization of two or more decoders.

What is needed in the art are systems and methods to implement and facilitate cross-fading, blends, interstitials and other effects/processing of two or more media elements on a downstream device for various purposes so as to enhance the listening experience, and, for example, replicate to the extent possible the sound and feel of broadcast programming.

What is further needed in the art are methods to perform such processing involving two or more elements on a downstream device, where only a single hardware decoder is available or where other system constraints are operative.

BRIEF DESCRIPTION OF THE DRAWINGS

It is noted that the patent or application file may contain at least one drawing executed in color. If that is the case, copies of this patent or patent application publication with color drawing(s) will be provided by the U.S. Patent and Trademark Office upon request and payment of the necessary fee.

FIG. 1 depicts an exemplary cross fade system provided on a client mobile device having a single decoder, according to an exemplary embodiment of the present invention;

FIG. 2 depicts an exemplary system content distribution and reception system according to an exemplary embodiment of the present invention;

FIG. 3 depicts an exemplary service provider content distribution system for delivering content supporting client enabled cross-fades according to an exemplary embodiment of the present invention;

FIG. 3A depicts a comparison of several exemplary sigmoid functions that can be used in exemplary embodiments of the present invention;

FIG. 4 depicts an exemplary (client side) content reception system featuring (i) a single decoder and (ii) a software accessible output buffer for a service supporting faster than real-time client enabled cross-fades according to an exemplary embodiment of the present invention;

FIG. 5 depicts an exemplary content reception system featuring two or more decoders, (but no software accessible output buffer) for a service supporting dual decoder, synchronized real-time client enabled cross-fades according to an exemplary embodiment of the present invention;

FIG. 6 depicts exemplary process flow for constructing an audio stream based on merging two separate audio files decoded faster than real time using the exemplary system of FIG. 4 according to an exemplary embodiment of the present invention;

FIG. 7 depicts exemplary process flow for constructing an audio stream based on adjusting the audio volumes of two decoder outputs using the exemplary system of FIG. 5;

FIG. 8 is an exemplary system timing diagram for client based cross-fade management;

FIG. 9 illustrates an exemplary three element cross-fade including a clip that is faded from, a clip that is faded to, and a voice over clip, according to exemplary embodiments of the present invention;

FIG. 10 is an exemplary decision tree for fade control assignment according to exemplary embodiments of the present invention;

FIG. 11 is an exemplary decision tree for clip limit selection according to exemplary embodiments of the present invention;

FIG. 12 is an exemplary decision tree for transition selection according to exemplary embodiments of the present invention;

FIG. 13 is an exemplary decision tree for concurrent layer selection according to exemplary embodiments of the present invention;

FIG. 14 is an exemplary decision tree for content download/playback selection according to exemplary embodiments of the present invention;

FIG. 15 is a chart of various dynamic decision criteria influencing algorithm selection according to exemplary embodiments of the present invention; and FIG. 16 illustrates exemplary software modules on server (upstream) and client side (downstream) according to exemplary embodiments of the present invention.

SUMMARY OF THE INVENTION

Systems and methods are presented for cross-fading (or other multiple clip processing) of information streams on a user or client device, such as a telephone, tablet, computer or MP3 player, or any consumer device with audio playback. Multiple clip processing can be accomplished at a client end according to directions sent from a service provider that specify a combination of (i) the clips involved; (ii) the device on which the cross-fade or other processing is to occur and its parameters; and (iii) the service provider system. For example, a consumer device with only one decoder, can utilize that decoder (typically hardware) to decompress one or more elements that are involved in a cross-fade at faster than real time, thus pre-fetching the next element(s) to be played in the cross-fade at the end of the currently being played element. The next elements(s) can, for example, be stored in an input buffer, then decoded and stored in a decoded sample buffer, all prior to the required presentation time of the multiple element effect. At the requisite time, a client device component can access the respective samples of the decoded audio clips as it performs the cross-fade, mix or other effect. Such exemplary embodiments use a single decoder and thus do not require synchronized simultaneous decodes.

DETAILED DESCRIPTION OF THE INVENTION

In exemplary embodiments of the present invention, systems and methods can be provided in which cross-fading (or other processing/effects) of multiple information streams is accomplished at a client end in accordance with instructions that can be provided from an upstream service. Such instructions reflect a combination of (i) the information clip, (ii) the device on which the cross-fade is to occur, and its various parameters and capabilities, and (iii) the service provider system.

It is noted that for ease of description herein, the term "cross-fade" will sometimes be used generically to refer to any and all type of blending, cross-fading, cross fade or blend plus one or more interstitials, and interactions of every type between subsequent elements in a media playlist delivered to a user.

In what follows, for ease of description, a model will sometimes be used where a service provider, such as, for example, a media delivery company or similar entity, sends multiple clips or streams of digital media to various client devices, along with instructions to those devices as to how to process those multiple clips or streams on the client device (i.e., a user's device). The client device can be, for example, owned by subscribers of the service provider. Content and data sent by the service provider will thus often be referred to herein as originating "upstream", and the processing of data on a client device will similarly be referred to as occurring "downstream," or by a "downstream component." In fact, while it is contemplated in some exemplary embodiments that user devices can come preloaded with applications that can receive the instructions and process the multiple information streams as described herein, it is also possible, for example, to send the applications themselves, or updates thereto, to client devices from the service provider over the Internet, a VPN, or other communications channels, which can then be installed and run cross-fade processing.

One exemplary context in which the techniques of the present invention are applicable is a "personalized channel" media distribution service, such as a personalized music service such as, for example, Spotify, Pandora, Grooveshark, and various others. For example, a media distribution company, such as, for example, an enhanced iTunes™ type service, or, for example, the personalized channel service being developed by the applicant hereof, Sirius XM Radio Inc., can offer its users personalized playlists organized by genre, type or channel. Such playlists can further be modified by user preferences, both explicit and/or implicit, the latter captured by "preference engines" such as are touted by the Pandora™ service and the like. In such personalized channel or personalized playlist services, each individual user can, for example, have his or her own set of media files that the service provides, via the Internet or other data connection. In exemplary embodiments of the present invention, such services can be enhanced by not only sending a simple set of media clips or streams, but by also sending instructions for, and managing via two—way messaging, for example, various cross-fades, voiceovers and other "DJ" type effects or enhancements at each transition between one clip and the next. This gives the user or subscriber a characteristic "broadcast" or "DJ" experience, or an enhanced experience in ways that even transcend common DJ add-ons, even when he or she is listening to her MP3 clips from, for example, her smart phone. Alternatively, for example, one can play their personalized channel through their home audio system and have their various Sirius XM personalized channels supply dance music to a party, wedding or other event. In such an exemplary use, if the techniques and systems of the present invention are fully implemented a user can essentially receive a DJ experience that is better than the vast majority of "DJs" one can hire for a party or event.

It is noted that client devices are generally provided with a single hardware implemented decoder. Many can have a second software implemented decoder as well. Thus, in exemplary embodiments of the present invention, a consumer device with only one decoder, can, for example, utilize that decoder (typically a hardware decoder) to decompress one or more elements that are involved in a cross-fade at a faster than real time rate, thus pre-fetching the next element(s) to be played in the cross-fade (or other multiple element effect) at the end of the element currently being played. Such exemplary embodiments make use of a single decoder and thus do not require synchronized simultaneous decodes to be managed.

FIG. 1 illustrates such a system at the conceptual level. With reference thereto, two compressed audio clips 110 and 120 can be received from a service provider. The two audio clips can be, for example, (i) downloaded to an exemplary client device and stored in an input buffer 130 on that device. They can then be (ii) sequentially decoded by a software or hardware decoder 140 at a rate that is faster than real time, prior to their required presentation time, e.g. of a cross-fade, and can be, for example, respectively stored in separate portions 150, 160 of a decoded sample buffer 151. Finally, they can be (iii) mixed or cross-faded by a downstream component and then output as processed audio 180. The decoded audio clips and their respective samples can thus be accessed by downstream component 175 as it performs the cross-fade, mix, blend or other effect.

For example, in a cross-fade, one mixes the samples comprising the outro of a currently being played clip, e.g. Audio Samples 1, with the samples comprising the intro of the next clip to be played, e.g Audio Samples 2, as shown in FIG. 1. Thus, as seen in FIG. 1, Outro of Audio 1 152 can start the cross-fade at maximum volume and end it at minimum or no volume (see descending dotted blue line with slope approximately equal to $-1$), and Intro of Audio 2 162 can start the cross-fade at minimum volume and end it at maximum volume (see ascending dotted blue line with slope approximately equal to 1).

Thus, to implement a standard cross-fade, an exemplary downstream component (for example, a hardware or software module resident on a client device) can access the first sample of Audio Samples 2 in Decoded Buffer 151 and mix it with the required audio sample(s) at the end of Audio Samples 1, also in Decoded Buffer 151, to implement the cross-fade. For example, if the desired effect is to cross-fade over a period of 1 second, then, at a sample rate of 44.1 kHz, the transition can use the last 44,100 samples of Clip 1 and the first 44,100 samples of Clip 2. Using an index that provides an offset of N samples from the end of Clip 1, such as, for example, End_Clip_1-N, an exemplary downstream cross-fade component can begin the fade at End_Clip_1-44, 100 and mix that sample with Clip 2, Sample 1. The next processed sample pair would be (End_Clip_1-44,099) with (Clip 2, Sample 2), and processing would continue in similar fashion until the final sample at the end of Clip 1 was processed with Clip 2, Sample 44,100. As shown, the mix of these samples can, for example, be output to a user as Processed Audio Out 180. FIG. 2 presents an exemplary high level system architecture supporting client side cross-fade according to exemplary embodiments of the present invention. The exemplary system includes a Content Service Provider 210, Distribution Channels 220, and Client Device 230. Content Service Provider 210 is responsible for preparing the content (such as, for example, audio clips, video clips, voice overs, etc.) and the data and instructions (such as, for example, timing variables, type and trajectory of effect, etc.) and interacting with the client in such a manner as to permit the download and delivery of the content to the client device in such a manner so as to support client side effects, such as cross-fades. Distribution Channel 220 is understood to include any distribution channel that supports broadcast or Internet based content delivery, and can include, at times, one or more of such distribution channels operating in concert.

FIG. 3 provides additional details of Content Service Provider 210's system. With reference to FIG. 3, Content Service Provider 210 can include a Playlist Editor 310 which can be used to manage the distribution of content to clients. The choice as to content can be made, for example, as part of a personalized channel service, and can include, for example, preference engines and/or user defined parameters, as well as user feedback to songs or clips played to her, to determine what clips or songs to send each user on each of his or her "personalized channels." These playlists can be stored, for example, in a Content Playlist 320 which can be accessed, for example, by one or more Playlist Editor(s) 310. As shown in FIG. 3, the term "Playlist Information" as used herein, and as used for cross-fade or other processing purposes, can include a Playlist Type (e.g. Pop, Classical, Blues, etc.) and a Transition Type that is specified to be used to transition between content clips. Such a Transition Type can include, for example, a desired transition effect (such as, for example, fade in, fade out, fade to voice over, etc.) as well as a transition trajectory (such as, for example, linear, non linear, fast, slow, etc.). Thus the Playlist Type provides a characterization of the playlist, as noted above, and the Transition Type provides a characterization of a particular clip from an ingress to an egress, which can often be quite nonlinear as to both time (number of samples to play at each quantization level) and volume levels, and quite thus complex. Thus, in exemplary embodiments of the present invention, Playlist Type and Transition Type can be used together to provide parametric data as to how a given cross-fade (or other multi-clip processing effect) should occur, from both a timing and a trajectory perspective. For example, a Playlist Type for a "Heavy Metal" channel might indicate quick fades between successive clips. Similarly, Transition Type provides a characterization of the transition between two clips that are to be cross-faded, independently of the Playlist Type. That is, Playlist Type provides a nuanced adjustment to how transitions between clips will be processed.

As an example, a Playlist Type can have four distinct functions that can be used for differing channels (or playlists), including, for example, a logarithmic function, a linear function and two sigmoid functions. The Playlist Type can also have parameters, which can be constants that adjust the trajectory of the function over the interval, as described below. Table I below provides exemplary values for such functions and parameters for four such Playlist Types, namely Heavy Metal, Easy Listening, Country and Rock.

TABLE I

Example Playlist Types

| Playlist Type | Outro Time (sec) | OutroType | Outro ParamA | Intro Time | Intro Type | Intro ParamA |
|---|---|---|---|---|---|---|
| Heavy Metal | 1 | Linear | | | Linear | |
| Easy Listening | 4 | Arctan | 1 | 4 | Arctan | 1 |
| Country | 2 | Logarithmic | 2 | 2 | Logarithmic | 2 |
| Rock | 2 | Tanh | | 2 | Tanh | |

Similarly, Table II below provides exemplary Transition-Types that can be applied in exemplary embodiments of the present invention.

TABLE II

Example Transition Types

| Transition Type | Time (sec) | Algorithm | ParamA | ParamB |
|---|---|---|---|---|
| LinearFadeInSlow | 2 | Linear | | |
| LinearFadeInFast | 1 | Linear | | |
| SmoothFadeInSlow | 3 | ArcTan | 1 | |
| SmoothFadeInFast | 2 | ArcTan | 2 | |
| QuickFadeOutSlow | 2 | ArcTan | 1 | |
| QuickFadeOutFast | 2 | ArcTan | 2 | |
| ZeroFadeIn | 0 | Linear | | |
| ZeroFadeOut | 0 | Linear | | |

Where the mathematical functions follow (i) some form of logarithm (as is popular in the broadcast community), (ii) a sigmoid function or (iii) some other monotonically increasing function, the parameters "ParamA" and "ParamB", as described in the two tables provided above can be, for example, constants which can adjust the slope of the function. For example, when using the tan h function, a parameter ParamA can be used such that tan h(Ax) is the actual value. FIG. 3A provides a comparison of some exemplary Sigmoid functions. In FIG. 3A all of the functions are normalized in such a way that their slope at 0 is 1.

It is understood that these functions can, for example, be realized as a set of discrete values over the interval, and it is these (attenuation) values that can be downloaded as a table or array to a client device to be used to adjust the volume of the content during the fade. For example, a 1 second linear fade out with a sample rate of 44.1 KHz can be represented as 44,100 multipliers, each with the value 1 diminished by 1/44,100 for each sample from the start. (e.g., 1.0, 0.999909, 0.999818, 0.999727, etc). The tradeoff between storing and computing the function, as opposed to downloading and using a table (with interpolation between values as needed), is an engineering decision and can, in exemplary embodiments of the present invention, be context specific, based on the instruction set of the client and performance considerations, as understood in the art.

The interaction between the Playlist Type (which defines an overall experience for a particular type of Playlist, such as a Channel) and the TransitionType (which defines an experience between two successive clips independent of the Channel) is one of priority. Thus, in exemplary embodiments of the present invention, if there is no TransitionType defined between two adjacent clips then a standard Playlist Type transition for that Channel can be used. If, on the other hand, a TransitionType is defined for those clips, then the defined Transition Type can be used instead of a default Playlist Type transition.

Continuing with reference to FIG. 3, Content Information repository 330 can provide storage for metadata regarding each clip. In a typical content distribution system this can contain many attributes that describe the content, such as, for example, (i) Content Identification, (Ii) Clip Length, (Iii) A Clip Intro List, (Iv) A Clip Outro List, And (V) Content Type. The clip intro list is a list of times relative to the start of a clip at which it is audibly pleasing to "enter" the clip during a cross-fade, such as, for example, at 1, 2, or 3.5 seconds form the start of the clip. Likewise, a clip outro list is a list of times relative to the end of a clip at which time it is audibly pleasing to "exit" the clip, such as, for example, at 1, 2.5, or 3.5 seconds prior to the end of the clip. Content Information 330 can thus be used by Content Scheduler 340 during scheduling of content for distribution. In exemplary embodiments of the present invention, an exemplary system can contain a Device Profile repository 360. Such Device Profile repository can include a characterization of various client devices, and their various versions or "flavors", including, for example, (i) Device Type (e.g., iPhone 4S. BlackBerry Curve, Droid RAZR, etc.); (ii) a characterization of the number of hardware decoders on the device; (iii) the time taken for each hardware decoder to decode an audio frame; (iv) the time taken for the device to decode audio frames using its software decoder, (v) Input Buffer Size, (vi) Decoded Audio Buffer Size, and (vii) Low Power Offset.

Information stored in Device Profile repository 360 can then, for example, be used by Content Scheduler 340 to schedule content for distribution and client device management. An example Device Profile table, Table III, with two sample entries, is provided below for illustrative purposes. In exemplary embodiments of the present invention the information provided in such a table allows an exemplary Content Scheduler 340 to optimize what content can be downloaded and played on a given device, and at what times.

TABLE III

Exemplary Device Profiles

| DeviceType | Hardware Decoders | HW Frame Decode Time (30 ms packet) | SW Frame Decode Time (30 ms packet) |
|---|---|---|---|
| SmartPhone | AAC+, MPEG 1, Layer 2 | 10 msec | 25 msec |
| LowCosPhone | N/A | | 25 msec |

In exemplary embodiments of the present invention, a system can further contain a Content Repository 350 which can be used, for example, to store actual audio clips in compressed form. In the exemplary system of FIG. 3, Content Repository 350 can provide content to Content Automation system 370 in accordance with directions from Content Scheduler 340. In general, content is delivered from Content Automation system 370 to clients over Distribution Channel 220 (as shown in FIG. 2) as compressed content using one of the many available compression formats, such as, for example, AAC+ or MPEG 1, Layer 2. It is noted that interstitials and voiceover clips are short in duration and may therefore alternatively be sent efficiently over distribution channel 220 in an uncompressed form, which puts a lesser burden on a decoder, especially one that runs more slowly (say, for example, at a maximum of 2×). Thus, to deliver content for an effect that requires, say, more than five (5) elements, if many of them are small enough to be sent in an uncompressed format, they can be directly stored to a decoded sample buffer (such as 151 in FIG. 1) on a client device, and it is then much easier to manage the decoder, say, to only handle a few of the clips. Therefore, Content Repository 350 can be understood to include both compressed and uncompressed audio, as may be desirable in various exemplary embodiments of the present invention.

Coordination of the delivery of content to a client device can, for example, be accomplished by Play Control instructions issuing from Content Scheduler 340, and/or Client Device Control instructions issuing from Decode Management 390 to particular client devices. Further, for example, Content Scheduler 340 can provide message communication regarding the availability of the playlists authored by Playlist Editor 310, and can also, for example, be responsible for allowing a client to obtain profile information regarding both devices and user preferences. Decode Management 390 (also known as "Client Device Management" 390) can, for example, provide message communication regarding low level interactions between the service provider and the client with respect to delivery of clip elements to a particular user that are to be merged together. In general, such messages will reflect a "taxonomy" of variables, parameters, and data fields defined by the content distribution system as needed to adequately manage a client device downstream component to perform the various transition effects for any cross-fade.

Exemplary Client Device Single Decoder System

FIG. 4 illustrates exemplary system elements within a client device to support audio playout and cross-fade/transition effects according to exemplary embodiments of the present invention. In particular, an exemplary client system (including a downstream component) includes a user 410 who interacts with the system to select audio content to be downloaded from a service provider via Playout Controller 420. Playout Controller 420 receives user requests to play a particular audio playlist, e.g. a given channel from the service provider, such as, for example, a "personalized channel", a regular or seasonal channel, or a series of clips, and initiates a request of audio clips (or parts of clips) from service provider 210 over distribution channel 220 (see FIG. 2). The Playlist is understood to include not only the clip name, but also selected metadata associated with the clip (for example, clip type, song, voice over, interstitial, effect; clip duration, clip size, clip intro, outro, and default cross-fade information) that will assist in the decision for decode, cross-fade and play out. Compressed audio can then be delivered to the client via distribution channel 220 (see FIG. 2) and can be loaded into a Compressed Audio Input Buffer 430. In exemplary embodiments of the present invention, Input Buffer 430 can be made sufficiently long to store not only the clip being played, but also the next clip (or part of the next clip) that the currently played clip will be faded with or transitioned into. The exemplary system of FIG. 4 also includes an embedded audio Decoder 440 that can decode compressed audio at a faster than real time rate, and buffers for uncompressed (decoded) audio 450, along with a FIFO (First In First Out) buffer 460 that can be used in conjunction with (i) the algorithm depicted in FIG. 6 and (ii) the information delivered from service provider 210 (FIG. 2), to provide a range of audio cross-fades, mixes or other transitions via Cross-fade component 470. In exemplary embodiments of the present invention Cross-fade component 470 takes the uncompressed signal levels of two source frames and generates a new signal level for the resulting frame based on the cross-fade mix, blend or other transition effect blend rate. In exemplary embodiments of the present invention, such a client system can also contain a Device Performance Agent 435. Device Performance Agent 435 can receive profile data from Playout Controller 420, and can be responsible for the real time management of the audio clip downloads and decoding thereof (if necessary) based on system resource availability.

Exemplary Client Device Multiple Decoder System

FIG. 5 depicts an alternate exemplary system for cross fading two clips according to exemplary embodiments of the present invention. This system can be used, for example, where two simultaneous decoders are available, either in hardware, software or both. With reference thereto, a client system embodiment can include Playout Controller 510 which can be responsible for message exchange with Service Provider 210 (FIG. 2) to obtain device characteristics and user profiles. Playout Controller 510 can, for example, interact with, and coordinate, the delivery of data within the system including (i) Input Buffer 520, (ii) decoders Decoder-A 530 and Decoder-B 540, (iii) decoded data buffers Decoded Buffer-A 550 and Decoded Buffer-B 560 which store uncompressed audio, as shown, (iv) playout volume adjustment controls on audio play out Volume-A 570 and Volume-B 580, and (v) Audio Presentation layer 590. It is noted that the depicted buffers are logical constructions and need not be distinct from one another. Thus, a single buffer can be used in place of, for example, 520, 550, and 560. Just as in the system illustrated in FIG. 4, Device Performance Agent 525 can receive profile data from Playout Controller 510, and can be responsible for the real time management of the audio clip downloads based on system resource availability. Thus, the various system components of FIG. 5 permit the control of two audio decoders (either software or hardware decoders) and the blending of two clips (at the appropriate offsets, as noted above) to be cross-faded, blended or otherwise processed by adjustment of the volume levels on the two decoders, and the summation of the two audio outputs. Such blending can be performed, for example, using instructions received from Content Scheduler 340 and Decode Management 390 (also known as "Client Device Management").

Exemplary Methods for Client Device Cross-fade

1. Direct Technique

In exemplary embodiments of the present invention, a method for accomplishing a cross-fade between two exemplary audio elements can be implemented as provided in FIG. 6. The illustrated method is known as the "Direct Technique," inasmuch as this approach can be used in situations where access to uncompressed audio on a client device is available (e.g., to a downstream component or application ("app") residing on the device) so as to facilitate cross-fades, blends, etc. This is the case, for example, in an iPhone or other "smart phone" type device. It is here assumed that there are two audio clips (files) to be cross-faded or similarly processed, and that there is a blend FIFO with sufficient memory to hold M frames of uncompressed audio. In the figure, M refers to the number of frames to blend between files, N refers to the number of frames in the file minus M (i.e., the part that is not an intro or an outro, for example), and F the number of frames in the blend FIFO. Moreover, a solid line or arrow denotes a direct state transition, and a dotted line or arrow a state transition into parallel decode.

The exemplary method works as follows. A FIFO buffer of length F will maintain audio elements to be blended during the cross-fade. Given an audio element of length N+M, where M is the number of compressed frames to be cross-faded between the two clips, at 610 the first file is referenced from the input buffer (430 in FIG. 4) starting with the first frame, i=0, and at 620 the frame is extracted. Since, in general, this frame would be merged with the (N+M−M) frame of the previous clip, an inspect is made at 630 to see if i<M. If yes, we are in the intro of the current frame and the frame is to be blended, so the FIFO buffer is popped and frame i is blended with this frame (which would be N+M−M), in accordance with the cross-fade directions received based on Playlist Type and Transition Type, as described above. For example, if an audio frame has 2048 samples, then for a 50 frame blend (which thus has 102,400 discrete samples), a linear cross-fade might be to reduce the audio sample signal level value of sample A by 1/102,400 and increase the audio sample signal level value of Sample B by 1/102,400 (whether one actually hears this fine gradation is subject, of course, to sufficient quantization levels to support this granularity, and also good hearing). These two values can then be combined to implement the fade. Likewise, an aggressive fade might be, for example, to decrease the value from the FIFO signal value more quickly and increase the frame i signal level correspondingly. It is thus noted here that there are many potential mathematical algorithms that can, for example, be applied to the sequence of clip frames that will effect various different transitions. In general a "broadcast quality" experience does not involve a simple linear cross-fade, but rather something more complex, which can be, for example, genre, channel and, even possibly, song specific.

Continuing on this path, the FIFO length is checked to see if there are frames in the blend buffer (F>0?) at 660. If there are no frames to blend, then at 640, the current frame is inserted into the FIFO for future blending. From 640 a test is made, at 680, to see if i>=N. If YES, the audio frame i is submitted to audio output at 670, i is incremented at 696 and the next iteration started at 620. However, if at 680 i is not>=N, and NO is returned, then a test is made at 690 to see if i==N. If the test returns YES, then the frame is at the start of the outro part of its fade. Accordingly, at 698 the next clip (file) should be started for processing. If the test returns NO at 690, then a second test is made, at 695, to see if i==N+M−1. If this is the case, then the current clip has concluded and processing on the clip is terminated at 697. If at 695, if i is not==N+M−1, and thus NO is returned, then there are more frames to process, and thus i is incremented at 696 and the next frame is processed at 620. From 660, if F is >0, and YES is returned, then the frame being processed should be blended with a last frame in the blend buffer. I.e., on this path, the cross-fade component 470 in FIG. 4 is called to perform the blend, as noted above. Therefore, we can extract the last frame from the blend buffer at 650 and blend it with the current frame. From 650 the blended frame can be passed to 670 for audio output, i can be incremented at 696, and the next frame can be started for processing at 620. This algorithm, and the processing of audio frames using it, can be a very useful technique in exemplary embodiments of the present invention that are provided on smart phone client devices or the like.

2. Indirect Technique

However, it is readily appreciated that various other methods for accomplishing a cross-fade or other transition between two audio elements can similarly be used. With reference to FIG. 7, an alternate method is illustrated, known as the "Indirect Technique." This approach is applicable to situations in which there is no access by an exemplary application or device resident module to the uncompressed audio buffer on a client device. This is the case in, for example, Android type devices and Flash devices. In this situation it is necessary to adjust the volume control of the output from simultaneous decoders to effect the desired result. It is noted that this approach is also applicable to situations in which access to the decoded audio buffer is available. In general, this approach can be used when conventional cross-fading is effected at the client side, such as in a conventional linear fixed interval cross fade, without the benefit of the novel techniques and methods described herein.

As noted in FIG. 7, a client device platform should allow multiple decode sessions and mix output audio for each session. In FIG. 7, M refers to the number of frames to blend between files, and N refers to the number of frames in the file after subtracting M. Once again, a solid line or arrow denotes a direct state transition, and a dotted line or arrow a state transition into parallel decode.

With reference to FIG. 7, the exemplary method can be initiated by starting to decode the first file at 710, and then by reading the first frame of the file and providing it to the decoder at 720. Just as was done in the exemplary Direct Technique method shown in FIG. 6, a test can be made at 730 to see if i<M (which is the number of frames to be faded over; i.e., the frame index i has not yet reached M, which is where the fade is to start). If i is not <M, and NO is returned at 730, then at 740 the volume of the player should be set to 100%. A test can then be made, at 770, to see if i==N (last frame of the file before the cross-fade). If YES, the next file should be started for decoding in parallel at 799, and the current decoder's volume set to 100%. The value of i can then be incremented at 768, and the next frame processed at 720. However, if i is not==N, and NO is returned at 770, then a check can be made at 785 to see if i==N+M−1 (the last frame of the file). If YES, then processing ends at 790. If NO, then i is again incremented at 768 and the next frame processed at 720. From 730, if i is not <M, and NO is returned, a check at 750 needs to be made to determine if another decoder is running. If YES, and another decoder is in fact running, the cross-fade volume adjustment between the two decoders is performed at 760, i.e., a decrementing of the volume of one and an incrementing of the volume of the other. For example, this can be done as follows: for linear fades adjust in proportion to N, for nonlinear (real-world) fades a more complex schema can be used. From 760, a test can be made at 780 to see if the fade is complete so that the other decoder can be removed at 795. If it is not complete, it is necessary to check for i==N at 770, as before, and process the remainder of the file.

Exemplary System Timing for Client Side Cross-Fade Management

As noted above, when only one hardware decoder is available on a given client device, faster than real-time downloading can be used to pre-fetch the next clip to be used in a cross-fade or other transition. System timing to support such a faster then real time download and subsequent cross-fade, blend or other multi-component effect or processing between audio elements is illustrated in FIG. 8. FIG. 8 thus shows an example of three successive audio clips being played, with two element cross-fades at each transition. Thus there are shown two two-element cross-fades. Initially, when a client device starts at 810, the client Playout Controller (410 or 510, as above, in FIGS. 4-5) will communicate with the service provider to obtain content schedule information from a Content Scheduler (such as 340 in FIG. 3). The client informs the service provider of the device type being used, and the user ID (by messaging, for example, with Client Device Management 390). Given this information, (i) a device profile can be downloaded for that client device to be used for blending content in the device, and likewise, (ii) a user preference profile can also be downloaded to the client device to be used in blending content based on various user preferences and system knowledge about the user.

As shown at 810, a first clip can be downloaded to the client by means of client device control messages between a client Device Performance Agent 435 (in FIG. 4) and Decode Management (also called Client Device Management, as noted) on the service provider side (390 in FIG. 3). As noted above, the Device Performance Agent is responsible for monitoring the system resources on the client side, and providing information for requesting new clips in accordance with the time it will take to decode the requisite cross-fade elements and blend them (and the availability of memory and resources on the client device, as well as link speed and conditions). This information can be readily computed from (i) device profile information, (ii) user preference information, (iii) the time taken to decode a frame, (iv) the intro and outro information for each clip, and (v) the then prevailing channel bandwidth and availability of system resources on the client device, for example. The client then can start to play the first clip, as shown at 810. At 820, at some point prior to the start of the first clip's outro, the second clip (or part thereof) can be downloaded to the client device. The start of this download can be determined, for example, by the parameters noted above, and must take into account, as noted, any network conditions, bandwidth restrictions and latency issues. The computation of when to start this second clip download requires that the second clip (or part thereof) be available within the client before the cross-fade or other transition effect is to be started.

At 830, at the point determined by an algorithm as described above, the cross-fade between the $1^{st}$ clip and the $2^{nd}$ clip can be effected (beginning (left side) of crossed dotted lines). At 840 the cross-fade has concluded (ending (right side) of crossed dotted lines) and the $2^{nd}$ audio clip can be played by itself. At some later point, 850, it is time for the next audio clip (the $3^{rd}$ clip) to be downloaded, and once again this must occur a sufficient time prior to the end of the $2^{nd}$ audio clip's ending (i.e., prior to the outro of clip 2) so as to start the cross-fade, as described above, resulting in a second cross-fade starting at 860 and concluding at 870. It is noted that although delivery of audio clips to the client can be handled in a just-in-time manner (as described herein), any subsequently needed clip can, in fact, be delivered from any point prior to a quantity of time T equal to {cross-fade starting time+processing delay}, as indicated by time interval 880. Thus, at any point within dotted line 880 the download of clip 3 can start, and it must start no later than point 850.

It is noted that the various clip transition methods described herein are in no way limited to only two elements being cross-faded or processed, but rather are applicable to any (reasonable) number of elements that are desired to be overlaid. In contrast to the cross fades of FIG. 8, therefore, an example of a three element cross-fade is thus provided in FIG. 9, as an example of such multi-element processing. In particular, one approach used within the broadcast community is the use of a voice over during a cross-fade. In this instance the fade out and fade in elements can be attenuated, and another, third audio element is imposed "on top of" the first two. This is the familiar DJ speaking over an attenuated cross-fade of two successive songs or tracks, such as, for example, "That was Led Zeppelin, with the eternally intriguing Stairway to Heaven, and now another reflective classic, Kansas, with Dust In The Wind."

With reference to FIG. 9, three such clips are illustrated. Clip 1 910 (Audio Samples 1) is the currently playing clip, such as, for example, a song on a given Sirius XM personalized channel. Clip 1 begins to fade out starting at Outro of Audio 1 912, and Clip 3 930 (Audio Samples 3) is the next clip to be played. Clip 3 fades in starting at Begin Intro of Audio 3 932, which is some time after the Outro of Audio 1 912 begins. Superimposed over this cross fade is a Voiceover Clip 2 (Audio Samples 2) 920, which can be blended with the others as shown. Voiceover of Audio 2 begins at time 922, essentially the same time as when Outro 912 begins (this is exemplary, and not required), and increases in volume until it reaches a plateau, which continues through about midway through the Intro of Audio 3, and then decreases in volume and finally ends at End Voiceover of Audio 2 at time 923, as shown. As noted, Begin Voiceover of Audio 2 922 begins at the same time as Outro of Audio 1 912, and ends at the same time as End Intro of Audio 3 925. In such instances, the inventive principles described above can be applied to both clips 2 and 3 (i.e. the download of both clips 2 and 3 occurs before they are to be blended with clip 1). As noted above, the voice over and cross-fade characteristics can be adjusted based on user preference, playlist characterization and/or channel characterization, to effect a voiceover/fade that is consistent with the expectations, parameters, and/or preferences of a given playlist, given channel and a given user. Thus, the previous examples may be extended to three or more audio elements, or even say ten, for example, where, for example, a cross-fade between two adjacent songs can be performed, and during the middle section of the cross-fade a DJ voices over with some interesting fact about the next song and plays some sound effects. When the intro of Clip 2 and the outro of Clip 1 are relatively long, and where there are points in those portions where neither signal has much activity, a DJ voice over or sound effect(s) can enhance the listening experience, as is generally appreciated by anyone listening to a well-programmed broadcast station. This gives a substantially enriched experience to a sequence of songs that is far more interesting than simply running them one after another with no programming.

As mentioned above, it is further noted in this context that typically, voiceover clip elements, as well as sound effects, are short in duration, and thus it is possible to send these audio elements from the service provider to the client as uncompressed audio, and simply blend them into the other two audio streams without the need for audio decoding. Clearly there is a tradeoff with respect to network bandwidth requirements. An integrated service provider solution as described herein thus permits the calculation of this as part of the download management.

Core Concepts Needed to be Addressed in Implementations

Next described in general, and then below in particular with reference to FIGS. 10-15, are various core functionalities and issues that need to be considered and addressed in any implementation of a cross-fading or other multi-clip processing application as described above. These include the following:

Differentiated downloading of clip based on clip type (using metadata, e.g., song/effect/interstitial), using a hierarchy (for example, songs=1, voiceover=2, interstitials=3, and sound effects=4). Thus, a given system may elect not to download certain clips based on device type and dynamic conditions. To implement this granularity, a hierarchy of clip types needs to be created and implemented so that in less than optimal conditions complex cross-fades and effects need not be performed, and their less crucial elements need not be downloaded (e.g., sound effects).

Comparison of minimum decode/processing time for upcoming events versus remaining event play-out time. Based on this information a decision about what to download and/or process (i.e., simplification of effect) can be adjusted dynamically. Thus, not just nominal processing power, decoder type and speed, and input buffer size of a client device is taken into account, but rather the dynamic actual values for these variables, in addition to network conditions. All of these variables can cause the minimum decode/processing time for upcoming events to vary in any real world context.

Number of concurrent layers to be utilized/supported in cross-fade or other processing. In other words, whether to permit overlay between, for example, ClipA, VoiceOver and Clip B or back to back play-out, based on device type and dynamic conditions.

Server side controlled fades/transition effects is generally only useful/applicable to deterministic systems. For all non-deterministic systems it is recommended that the client side be passed parameters and given control of the cross-fade/transition effect. If server side control is used, it must be tightly coupled to the client stream playback time-line. However, if client side control is used, the client device must compute an event timeline based on metadata parameters passed and dynamic conditions. This requires sufficient processing power on the client device.

For a high speed deterministic network a long pre-cache is undesirable, inasmuch as it does not buy any advantage and wastes bandwidth. For a non-deterministic network link, such as via a smart phone, a long pre-cache can be very desirable, and obviously insures all elements needed for future playback are on the client device, but these efforts are wasted if the user does not remain on the current channel, to which the pre-cached elements relate. There is thus a trade-off, and information regarding likely "stickiness" of user to the current channel is a necessary input to any dynamic calculation of when to use/not use a long pre-cache.

FIGS. 10-14—Exemplary Decision Trees for Implementation

To implement the core concepts listed and described above, in exemplary embodiments of the present invention, logic can be created that can make decisions based on device type, device conditions, user behavior (past and predicted), user preferences, complexity of cross-fade, blend or effect, and network conditions. FIGS. 10-14, next described, present exemplary decision trees from which such logic can be created in exemplary embodiments of the present invention.

FIG. 10 is an exemplary decision tree for fade control assignment according to exemplary embodiments of the present invention. This decision tree provides logic for deciding whether or not to use client-centered control of cross fade, by receiving parameters from an upstream server, or by using the upstream server itself to control the cross fade using "fade now" type semantics. Server-side cross fading is detailed, for example, in U.S. Provisional Patent Application No. 61/687,049, filed on Apr. 17, 2012, the disclosure of which is hereby fully incorporated herein by reference.

With reference to FIG. 10, the decision process begins at 1010 where the channel characteristics of the connection are obtained. This is done by the device and transmitted upstream to the server. Once that is done, process flow moves to 1020, where the type of the connection is obtained and is likewise transmitted upstream. There are two possible responses to this query at 1020, namely, the communications channel is either a fixed connection or a mobile connection such as on a mobile device. A fixed connection is, for example, a computer or other device ultimately connected to a home or office with hardwired Internet access. The fixed connection is deterministic because, given the fixed link, the characteristics of the communications pathway can be reasonably known and are reasonably consistent. On the other hand, a mobile connection over a wireless network, such as, for example, a 3G, 4G or the like, is non-deterministic in that as a user moves through space, or as network conditions vary, the characteristics of the communications link in general will change. Following down the "fixed" pathway to 1030, device characteristics can then be obtained, which can then be transmitted by the device upstream to the server.

The server, in general, can, for example, have a large library of device profiles and methods of implementing cross fades/multi-element effects that can be optimized once device characteristics are obtained at 1030 and transmitted upstream. It is recalled that an exemplary device profile table (for the trivial case of two devices) was presented above in connection with FIG. 3. Because such optimization is dependent in part on a device's processing power, the decision can occur, for example, once it is determined whether the device has low processing power or high processing power. This is queried at 1040. Thus, if at 1040 the return to the query is that the device has Low Processing Power, then at 1060, the cross fade or other effect can be implemented on the server side (upstream) using real time "fade now" controls issued, for example, from the service provider. This is fully acceptable inasmuch as given the deterministic nature of the connection, a "fade now" command can be expected to be timely received and implemented, without erratic network delays. If, however, at 1040 the return is that the device has High Processing Power, then at 1050, the cross fade or other effect can be implemented on the client side by passing parameters to the client device, and having the client schedule them using its own timing calculations.

Alternatively, returning to 1020, if it is, in fact, a non-deterministic connection to the server, such as, for example, on a mobile device, then process flow moves directly to 1050 where the cross fade, blend or other multi-element effect can be scheduled by passing parameters to the client device, here a mobile device, and having such client device schedule them using its own timing calculations. (It is assumed that the mobile device has high processing power; it is understood that one can implement different logic to account for non-deterministic, yet low-end, mobile devices assuming that cross-fading was to be implemented on them).

Similarly, FIG. 11 illustrates an exemplary decision tree for clip limit selection according to exemplary embodiments of the present invention. Its logic addresses the decision as to how many clips to download to the client device ahead of the then currently playing clip, and returns a ClipLimit. The more clips that are downloaded, the greater the flexibility and reliability, as noted above, but this also requires more then available storage on the client device. An additional consideration is whether the user will continue listening to his or her current channel, known as user "stickiness" to that channel. If yes, then it makes sense to download many clips, even up to the length of the current playlist. If not, and the user changes channels, then all of the downloaded clips will be thrown out, and the effort was a futility. Prediction algorithms can here be used to estimate "stickiness" to such channel for such user, with various confidence intervals.

With reference to FIG. 11, beginning at 1110, channel characteristics are obtained in similar fashion as at 1010 in FIG. 10. Once the channel characteristics have been obtained, a similar decision is made at 1120 as was made in FIG. 10, where it is determined whether the device is fixed or mobile and, therefore, whether there is a deterministic-type communications channel or a non-deterministic type communications channel. If the communications channel is of the deterministic type, then process flow moves to 1180 and a clip limit of one song plus one subsequent programming element is chosen. If, on the other hand, at 1120, it is determined that the device is mobile, and, therefore, connected over a non-deterministic communications link, then at 1130 the device characteristics are obtained, and at 1140 a query as to whether the device has a low-input buffer size or a high-input buffer size is made. If the device has a low-input buffer size, then process flow ends at 1170 where the clip limit is set at one song plus any subsequent programming elements that relate to that next song or the transition to it. If, however, at 1140 it is determined that the mobile device has a high-input buffer size, then it is possible to download a number of songs and associated cross fade or transition elements for each song transition within that number of songs. However, as noted above, this can be a futility if the user is likely to simply switch to a different channel. Thus, at 1150 it is first queried how "sticky" this user is to this particular channel, using whether he or she has been listening to this channel for a while as a metric. In general, if a user has been listening to a channel for a modicum of time and has not switched off of it, it is an indication that the user probably enjoys this channel and will likely stay with it for a while. This justifies downloading multiple lips that will service this device on this channel for some time to come. Other more complex algorithms can be used, including user listening statistics over time, with various parameters (time of day, season, etc.) charted to predict user stickiness. Thus, if at 1150 it is determined that the user has listened to the channel for a while, then process flow moves to and terminates at 1160, where the clip limit is set to be the full recommendation limit coming from the upstream server, including however many songs are in the current playlist plus any additional programming elements required to effect cross-fades, mixes, blends or other multiple clip effects at each transition between successive songs in this playlist.

If, on the other hand, it is determined at 1150 that the user is not that "sticky" or "loyal" to the current channel, and thus NO is returned at 1150, then that fact does not justify the assumption that he or she will necessarily stay with the channel for a long time. In such case process flow moves to and terminates at 1170 where the clip limit is set at one song and any subsequent programming elements necessary to transition to that next one song (the number of which depends upon the complexity of the cross-fade, as discussed above in connection with FIGS. 8 and 9). FIG. 12 illustrates an exemplary decision tree for transition selection, and it outputs to the client device which transition type to use between audio clips. Transition selection involves the decision as to whether to use clip specific defined transitions (Transition Type in FIG. 3) or transitions defined by the more general playlist type (Playlist Type in FIG. 3), as described above in detail (e.g. the defaults for a "Rock" or a "Classical" channel). The decision process begins at 1210 where the clip is obtained. Once the clip has been obtained, at 1220, the decision is made as to whether there is in fact a clip transition defined for this particular clip. If YES, then process flow moves to 1230 where the scheduled clip transition is set to be Clip Transition. On the other hand, if there is no clip transition defined, and NO is returned at 1220, then process flow moves to 1240, where the scheduled clip transition is set to be Playlist Transition. 1240 thus represents the default case, as described above in connection with Tables I and II. FIG. 12 thus implements the rule noted above, that if there is no Transition Type defined between two adjacent clips then the Playlist Type transition for that channel is used. If, on the other hand, a Transition Type is defined, then that specific Transition Type can be used instead of the default generic Playlist Type.

FIG. 13 presents an exemplary decision tree for concurrent layer selection according to exemplary embodiments of the present invention. The decision tree addresses the decision as to how to process clip cross fades, blends and voice overs in a manner that is typically found in a broadcast radio music experience, and returns what type of cross-fading or transition to use. The decision tree permits less complex devices to avoid having to manage multiple clips at the same time. In exemplary embodiments of the present invention, it just does not make sense to overburden a device with low-processing power to try and implement a bad version of the "DJ" or "broadcast type" music experience. It is, in fact, better to deliver a less complex version of the music service—but to do it well. Therefore, at 1310, the device type is obtained, and at 1320 the processing power of the device is determined. It is noted that this is not simply a specification of the device in abstract. Rather, in exemplary embodiments of the present invention, this is a function of both its inherent processing power and what else is happening on the device at the time. Moving now from right to left across the bottom of FIG. 13, if the client device has a low-processing power (or has an effectively low-processing power at this particular time due to the then present load on the processor), then process flow moves to and terminates with 1350 where simple clip concatenation can be used without any cross fading. Similarly, if at 1320 the return is that the device has medium processing power, then process flow moves to 1340 where two-layer clip cross fading, using at the most a clip A, a clip B, and a layered interstitial, is implemented, similar to the sequential cross-fades shown in FIG. 8.

Finally, if at 1320 the return is that the device has high processing power available, then process flow moves to, and then terminates at, 1330 where a three layer clip cross fading is implemented, as shown in FIG. 9, for example, using a clip A, a clip B and a layered interstitial (e.g., Voice Over Audio Samples 2, in FIG. 9). Thus, in connection with the implementations at boxes 1330 and 1340, it is noted that there are various ways to do a cross fade. One can use 3 layers, as shown in FIG. 9, where, given a current Clip 1 being played, at the end of Clip 1 there is a cross-fade of the outro of Clip 1 and the intro of Clip 3, and superimposed on that cross-fade is Voice Over Clip 2, as shown. Therefore, during the time interval that Voice Over Clip 2 is being played there are actually three elements simultaneously being played, and to be even more granular, the most active samples of Voice OverClip 2 are set to occur when the least action is going on in the cross fade of Clip 1 and Clip3. This is the complex type of transition called for at 1330. A less complex version of this transition is to simply cross fade between Clip 1 and Voice Over 2, play the remainder of Voice Over 2, but then cross fade between the end of Voice Over 2 and the beginning of Clip 3, but in no event are Clip 1 and Clip 3 ever being simultaneously played, as shown in FIG. 8. This is what is called for at 1340, and is chosen for devices with medium processing power. In such an approach the entire three element cross fade is implemented, albeit as restricted to only two elements ever being cross-faded at the same time. Or, alternatively, one could skip the Voice Over Clip 2, and simply cross-fade between Clip 1 and Clip 3. In either case a two layer cross fade can be implemented. Finally, at 1350 there is no cross fading called for at all, and all that occurs is one song ending and the next song beginning after the first song has entirely ended, known as concatenation. In fact, following the end of song 1 there may be a slight gap, barely audible, before song 2 begins. As is often the case in Internet music services, such a gap is often very audible.

Moving now to FIG. 14, an exemplary decision tree for content download/playback selection is shown. This decision decides as to which clips should be downloaded from the upstream server and when. It is noted that under optimum conditions all of the content will be downloaded and processed. However, under constrained conditions, some non-essential content may be omitted. The exemplary content download/playback selection decision tree of FIG. 14 can thus be used to decide when such constraint conditions apply and, given such constraints what can/should be omitted.

With reference to FIG. 14, processing flow begins at 1410 where the device type is obtained. Given the device type, at 1420 a query is made as to the then available (i.e., "effective") (i) processing power, as well as (ii) input buffer size, of the device. Thus, the query at 1420 is effectively a combination of the respective queries shown in 1140 and 1320, respectively, of FIGS. 11 and 13. These are dynamic variables which generally depend both upon the inherent capabilities of the device as well as upon how busy it is at the time. Moving from right to left across the bottom of FIG. 14, there are three possibilities, for each of (i) Low Processing Power, (Ii) Medium Processing Power And (Iip High Processing Power With High Input Buffer Size. Beginning on the right, at 1450, if the device has Low Processing Power at the time the query is made, then, for example, all that need be downloaded are the audio clips; all interstitials and programming elements are omitted. Moreover, the content is decoded just-in-time (to save room on the decoder output buffer and not waste decoder processing time) and there are no cross fades implemented upon play back. This optimizes the Low Processing Power type device. Next, at 1440, for a device with Medium Processing Power, the next audio clip as well as a single cross fade element can be downloaded, be it music to music or music to interstitial, etc. and only single layer cross-fades need be implemented (as in FIG. 8). This means that the three layer clip cross fade shown in FIG. 9 would not be implemented, even as a succession of two layer cross fades. Finally, at 1430, for a device with High Processing Power And A High Capacity Input Buffer at the time the query at 1420 is made, everything can be downloaded, namely, all of the programming elements and preprocess content can be downloaded well ahead of time, and playback of the downloaded content can be implemented using layered cross fades, including three, or even more, layers as may be dictated by the programming of the channel.

Summing up the logic set forth in FIGS. 10-14, FIG. 15 presents a chart of various dynamic decision criteria influencing download and playback algorithm selection. With reference thereto, there are four input variables, shown in the first four columns, namely 1505, 1510, 1520 and 1530, and a result or algorithm to be implemented given the various combinations of the states of those four variables, said result provided in the fifth column 1540. For example, looking at the top row (not counting the headings row) of FIG. 15, all of the input variables are high, and thus there is (i) a large amount of time available based on upcoming events, (ii) the input buffer size of the device is high, (iii) the device's available processing power is high, and (iv) the connection rate or compressed bit rate through the communications channel is high. In such case, at 1560, which is the ideal case, everything is downloaded, including all programming elements and preprocessed content way ahead of time, and the content can then, for example, be played back using layered cross-fades. This is essentially the maximum "broadcast type" experience, or even greater enriched experienced, that can be delivered on a client device. Continuing to the second row of FIG. 15, if the computed time available based on upcoming events is high or the value is not available, the input buffer size is high, the available processing power is low, but the channel connection rate is still high, then at 1561 everything is downloaded, using all programming elements and preprocess content well ahead of time, but due to the low processing power, only single layer cross-fades are used as opposed to multiple layer cross-fades, as in the algorithm provided at 1560. Continuing with the third row of the chart, conditions are here beginning to palpably deteriorate from ideal, or, in some cases, cannot be determined. Thus, if the time available based on upcoming events is not available, and if the input buffer size is low, or the available processing power is low, or the connection rate/compressed bit rate of the channel is low, then the selected algorithm, at 1562, is to download an audio clip and a single cross fade element and implement a single layer cross fade as to those two elements, for example, either music/music, or music/interstitial. Finally, at the bottom row of the chart, where the input variables 1505, 1510 and 1520 are all low, and the connection rate/compressed bit rate, is either low or data for it is unavailable, then, at 1563, only audio clips need be downloaded. No interstitials are or programming elements are downloaded, and the downloaded content (just audio) is decoded just-in-time, and no cross fades are be implemented. It is understood that the summary chart of FIG. 15 is one of many possible nuanced set of algorithms, and in actual specific implementations variations based on varying thresholds of input buffers, complexities of transitions desired or defined for a given channel, and thresholds/gradations of communications link quality and speed can be different, and thus various classes of charts such as FIG. 15, each individual implementing an exemplary variant, are all within and contemplated by the present invention. FIG. 15 is understood to provide examples, but the vast variations possible are indeed an open set, of which the algorithms 1560-1563 are exemplary paradigms.

Exemplary Software Modules and Pseudo Code

FIG. 16 illustrates various exemplary modules that can be used, for example, in an exemplary implementation, to implement various aspects of exemplary embodiments of the present invention. These can be provided, for example, in software, firmware, or even burned into gate arrays or hardware, as the case may be. As can be seen in FIG. 16, in this exemplary implementation a provider controller module can run upstream, on a system server, for example, and the remaining modules can be run downstream, on a client device, for example. This is most similar to the mobile device or smartphone situation described above, where it is optimal, given a device with sufficient processing power and input buffer capacity, as well as a good communications link, to pass cross fade control to the device.

Exemplary pseudo code is provided below for (i) a Provider Controller Algorithm 1610, (ii) an Client Event Scheduler 1630, (iii) a Service Provider Interface 1635, (iv) a Client Clip Buffer Manager 1645, and (v) a Client Playout Controller Algorithm 1640, all as shown in FIG. 16. Clip 1650, Blend FIFO 1655, and Decoder 1660 are simpler processes that are called by some of the larger modules, and are self-explanatory, as provided in FIG. 16.

ProviderController Algorithm

```
For each client i {
    new clientThread = ProviderController( );
    clientThread.run( );
}
Class ProviderController extends Thread {
    client[i] = Client.create( )
    client[i].setDeviceType(DeviceTable[i]);
    client[i].setPreferences(UserProfileTable[i]);
    client[i].setConnectionCharacteristics(ConnectionTable[i])
    connection.open(i);
```

```
        connection.send(client[i].getDeviceType( ));
        connection.send(client[i].getPreferences( ));
        connection.send(client[i].getConnectionPreferences( ));
        while (client[i].isListerning) {
            playlist = CreatePlayList( );
            connection.send(client[i].playList);
            if (ConnectionTable[i].hasChanged( ))
    connection.send(client[i].getConnectionPreferences( ));
            if (playlistType.hasChanged( ))
                connection.send(NewChannelLineup);
        }
    }
```

An exemplary Provider Controller Algorithm can, for example, reside on a Service Provider side and can, for example, be responsible for coordination of a Client Device with the Service Provider. It is understood that this coordination involves a complex set of interactions, which have been simplified in the above pseudocode for ease of illustration.

Client EventScheduler

```
Void EventScheduler( ) {
    sp = new Thread ServiceProviderInterface( );
    sp.getAuthentication( );
    sp.getUserProfileData( );
    cbm = new Thread ClipBufferManager( );
    decoder= new Thread Decoder(cp.clip( ).pop( ));
    repeat {
        wait (event) {
            if(event == spi.NewPlayList) {cbm.NewPlayList(spi.;
            if(event==spi.ConnectionChanged) {...};
            if(event==spi.Reauthentication) {....};
            if(event==spi.ProfileUpdate) {....};
            if(event==spi.NewChannelLineup) {...};
            if(event==TIMEOUT) {...};
        }
    }
} until event( ) == exit( );
```

This component resides on the Client Device and can be responsible for coordination decoding and playout of audio clips and interaction with the Service Provider. It is understood that this is a complex set of interactions, and for illustrative purposes, what appears above is a simplification.

Service Provider Interface

```
Class ServiceProviderInterface( ) extends Thead {
    public void run {
        authenticateWithServiceProvider( );
        deviceType = getDeviceTypeFromServiceProvider( );
        userProfileSettings =
            getUserProfileFromServiceProvider( );
        connectionSetting =
            getConnectionProfileFromServiceProvider( );
        if (deviceType == 'mobile') and (deviceType =='low
            power')
                crossfadecontrol = 'serversideRealTime'; else
                crossfadecontrol = 'clientsideParameterDriven';
    case (msg = waitOnMessage( )) of {
                'NewPlayList': event.signal(NewPlayList);
// playlist includes metadata: type, length, bits etc.
                'ConnectionChanged':
                event.signal(ConnectionChanged);
                'Reauthentication':
                event.signal(ReAuthentication);
                'ProfileUpdate': event.signal(ProfileUpdate);
                'NewChannelLineup'
                :event.signal(NewChannelLineup);
        }
}
deviceType getDeviceType( ) {. . .}
    // get device type details from service provider
    // populate deviceType object
}
userProfileSettings getUserProfile( ) {. . .}
channelSetting getConnectionProfile( ) {. . .}
    playlist getPlayList( ) {. . .}
```

This component can reside on the Client Device side and can be, for example, responsible for interactions with the Service Provider. Thus, for example, it can receive events from the Service Provider and adjust internal operations based on these events.

Client ClipBufferManager

```
Void Thread ClipBufferManager( ) {
Next ==0;
Loop{
    While (bufferSpace && next < clipLimit) {
        playList = serviceProvider.getPlayList(client);
        clip.Push( ) = getAudioClip(playList[next])
        if(playList.numberOfElements( ) < cliplimit)
            requestNewPlayListFromServiceProvider( );
        next++
    }}
    Wait(DecoderFinishedWithClip);
}
Void skipReceived( ) {
    While (clip.BufferLength( ) > 0) clip.Pop( );
}
```

This component can, for example, reside on the Client Device side and can be responsible for coordination of the download of clip data form, for example, a Content Information repository such as shown in 330 of FIG. 3. It can, for example, use metadata provided as a supplement to the playlist to determine which clips to download and insert into decoder processing.

Client Playout Controller Algorithm

```
Void Decode(clip) {
    m = clip.getMetadata("BlendFrameCount")
    n = clip.frames( )-m;
    f = blendFifo.frames( );
    label::
        frame = clip.decode(i);
        if (i<m) blendFifo.push(frame) {
        } else {
            if (f>0) {
                frame = frame.blend(frame,blendFifo.pop( ));
                audioOutput(frame);
                i++; goto(label);
            } else {
                blendFifo.push(frame);
                if (i >= n) {
                    audioOutput(frame);
                    i++; goto(label);
                } else if (i==n) {
                    newDecode = new Decode Thread(clip.Pop( ));
                    i++; goto(label);
                } else if (i==n+m-1) exit( ) else {
                    i++; goto(label);
                }
            }
        }
}
```

This component can, for example, reside on the Client Device side and can, for example, be responsible for decoding and cross-fading audio clips that are in a push down stack. The order of clips in the stack can be determined by the clip buffer manager and may be adjusted based on dynamic conditions, for example. Once a clip has started to be decoded it will continue until completed. It is noted that this algorithm is essentially equivalent to that shown in FIG. 8. It is understood that the algorithm can further be extended to take into account the concepts and functionalities described above in connection with FIGS. 10-15, as well as numerous and sundry variations of same as may be appropriate in different exemplary embodiments of the present invention.

As shown in FIG. 16, exemplary pseudocode for the basic processes Clip 1650, BlendFifo 1655 and Decoder 1660, can be as follows:

Clip

---
getClip( )
GetMetadata( )
getFrame( )
---

BlendFifo

---
Create( )
Destroy( )
Decode( )
InsertFrame(frame)
---

Decoder

---
Decode( )
Read Frame(frame)
Write Frame(frame)
SetAudioLevel(level)
---

It is further noted that the methods and techniques according to exemplary embodiments of the present this invention include and support the simultaneous decode of two clips or streams on a client device with live cross-fade or effects between them. This could be between any two or more elements included in a given playlist. The systems and methods described herein can accommodate multiple hardware or software decoders. In particular, a client side agent running with Device, Network, User Profile and Playlist data is able to ascertain the availability of system resources, and from these decide when to initiate a download or downloads, and in what sequence. In the event that there are two or more decoding systems (either hardware or software) the client agent can initiate the download of several clips and initiate the decoding of them ahead of their play time. It then becomes a simple matter to blend these in accordance with various blending algorithms selected based on the Transition Type, intro/outro data, Playlist and User Preferences.

As noted, it is understood that the present invention is not limited to either audio or cross-fades on a particular type of device, but rather encompasses a wide variety of device types (iPhone, iPad, etc) and a wide variety of domains in the media/entertainment sector (e.g., audio, video, computer graphics, gaming, etc.).

The above-presented description and figures are intended by way of example only and are not intended to limit the present invention in any way except as set forth in the following claims. It is particularly noted that the persons skilled in the art can readily combine the various technical aspects of the various elements of the various exemplary embodiments that have been described above in numerous other ways, all of which are considered to be within the scope of the invention.

What is claimed:

1. A method for implementing multiple element effects on audio packets on a client device having a single hardware decoder, comprising:
   downloading on a client device compressed audio clips to be used in a multiple element effect;
   storing the compressed audio in an input buffer;
   sequentially decoding at least one of said clips at a rate that is faster than real time;
   storing the decoded clips in separate portions of a decoded sample buffer; and
   accessing respective samples of the decoded clips from the decoded sample buffer while performing the effect.

2. The method of claim 1, wherein said multiple element effect is one of a linear cross-fade, nonlinear cross-fade, mix, voice over, voice over with sound effect, and multiple sound effect.

3. The method of claim 1, wherein at least one of:
   (i) the multiple element effect is a clip overlay to a cross-fade between two clips, and the second clip is decoded at a faster than real-time rate; and
   (ii) the multiple element effect is a clip overlay to a cross-fade between two clips, the second clip is decoded at a faster than real-time rate, and the clip overlay is downloaded in an uncompressed format.

4. The method of claim 1, further comprising taking the signal levels of the decoded audio clips and generating a new signal level for a resulting frame based on the blend rate of the multiple element effect.

5. A method for faster than real time cross-fading of audio packets on a device where access to a decoded audio buffer is unavailable, comprising:
   (a) decoding a first audio clip through a first decoder;
   (b) testing if the current frame is part of an intro;
       if it is not, playing the frame at 100% volume;
       if it is, determining if a second decoder is running;
           if a second decoder is running, then incrementing the first decoder's volume and decrementing the second decoder's volume;
           if there is not a second decoder running, then maintaining the first decoder's volume at 100%.

6. The method of claim 5, further comprising:
   determining if the current frame is the last frame in the first audio clip;
   if yes, stop decoding the first audio clip; and
   if no, obtain a next frame of the first audio clip and repeat (b).

7. A method for faster than real time cross fading of audio packets on a device where access to un-encoded audio is unavailable, comprising:
   (a) decoding a first audio clip through a first decoder;
   (b) testing if the current frame sent to the decoder is part of an outro;
       if it is not, playing the frame at 100% volume;
       if it is, determining if a second decoder is running;
           if a second decoder is running, then decrement the volume of the first decoder and increment the volume of the second decoder; and
           if there is not a second decoder running, then maintaining the first decoder's volume at 100%.

8. A method for implementing multiple element effects on audio packets on a client device having a single hardware decoder, comprising:

downloading compressed and uncompressed audio clips to be used in the multiple element effect;

storing the audio in an input buffer;

sequentially decoding at least one of said compressed clips at a rate that is faster than real time;

storing the decoded clips in separate portions of a decoded sample buffer;

accessing respective samples of the decoded clips from the decoded sample buffer and uncompressed clips from the input buffer while performing the effect.

9. The method of claim 8, wherein the downloaded uncompressed elements are short clips used during cross-fades, mixes and blends.

* * * * *